(12) United States Patent
Hu et al.

(10) Patent No.: US 11,941,804 B2
(45) Date of Patent: Mar. 26, 2024

(54) WRINKLE DETECTION METHOD AND ELECTRONIC DEVICE

(71) Applicant: Honor Device Co., Ltd., Shenzhen (CN)

(72) Inventors: Hongwei Hu, Beijing (CN); Chen Dong, Shenzhen (CN); Xin Ding, Beijing (CN); Wenmei Gao, Beijing (CN)

(73) Assignee: Honor Device Co., Ltd., Shenzhen (CN)

( * ) Notice: Subject to any disclaimer, the term of this patent is extended or adjusted under 35 U.S.C. 154(b) by 595 days.

(21) Appl. No.: 17/260,015

(22) PCT Filed: Sep. 18, 2018

(86) PCT No.: PCT/CN2018/106242
§ 371 (c)(1),
(2) Date: Jan. 13, 2021

(87) PCT Pub. No.: WO2020/015149
PCT Pub. Date: Jan. 23, 2020

(65) Prior Publication Data
US 2021/0327058 A1  Oct. 21, 2021

(30) Foreign Application Priority Data

Jul. 16, 2018 (CN) .......................... 201810776285.6

(51) Int. Cl.
*G06T 7/00* (2017.01)
*G06T 3/40* (2006.01)
(Continued)

(52) U.S. Cl.
CPC .............. *G06T 7/0012* (2013.01); *G06T 3/40* (2013.01); *G06T 3/60* (2013.01); *G06V 40/161* (2022.01);
(Continued)

(58) Field of Classification Search
CPC ........... G06T 7/0012; G06T 3/40; G06T 3/60; G06T 2207/20016; G06T 2207/30088;
(Continued)

(56) References Cited

U.S. PATENT DOCUMENTS 9,351,683 B2  5/2016 Yoshida
9,443,131 B2  9/2016 Yamanashi
(Continued)

FOREIGN PATENT DOCUMENTS

CN    101916370 A    12/2010
CN    103827916 A    5/2014
(Continued)

OTHER PUBLICATIONS

European search opinion for application EP18926958 dated Jul. 14, 2021. 7 pages . (Year: 2021).*
(Continued)

*Primary Examiner* — Juan A Torres
(74) *Attorney, Agent, or Firm* — Slater Matsil, LLP

(57) ABSTRACT

A wrinkle detection method includes: rotating a region, in a face image, in which a wrinkle needs to be detected, to obtain a plurality of to-be-detected images; determining wrinkle points from all pixel points based on grayscale values of the pixel points in each of the to-be-detected images with different angles; determining at least one wrinkle line based on the wrinkle points; and then displaying, by the electronic device, the wrinkle line in the region in which the wrinkle needs to be detected, where each wrinkle line indicates one wrinkle in each of the to-be-detected images.

12 Claims, 17 Drawing Sheets

(51) Int. Cl.
*G06T 3/60* (2006.01)
*G06V 40/16* (2022.01)

(52) U.S. Cl.
CPC .............. *G06V 40/168* (2022.01); *G06T 2207/20016* (2013.01); *G06T 2207/30088* (2013.01); *G06T 2207/30201* (2013.01)

(58) Field of Classification Search
CPC .......... G06T 2207/30201; G06T 2207/30242; G06T 7/181; G06T 7/13; G06V 40/161; G06V 40/168
USPC .......................................................... 382/128
See application file for complete search history.

(56) References Cited

U.S. PATENT DOCUMENTS

| | | | |
|---|---|---|---|
| 2014/0205159 A1 | 7/2014 | Yoshida | |
| 2015/0351682 A1* | 12/2015 | Yamanashi | G06T 7/0012 382/128 |
| 2015/0356344 A1* | 12/2015 | Yamanashi | G06F 18/00 382/103 |

FOREIGN PATENT DOCUMENTS

| | | |
|---|---|---|
| CN | 105310652 A | 2/2016 |
| CN | 107158570 A | 9/2017 |
| CN | 107330370 A | 11/2017 |
| JP | 2010119431 A | 6/2010 |
| JP | 5528692 B2 | 6/2014 |

OTHER PUBLICATIONS

Annex to the communication for application EP18926958 dated May 2, 2022. 5 pages (Year: 2022).*
Amended claims filed after receipt of (European) search report for application EP18926958 dated Jan. 5, 2022. 3 pages (Year: 2022).*
Batool et al., "Modeling and Detection of Wrinkles in Aging Human Faces Using Marked Point Processes", European Conference on Computer Vision. Springer, Berlin, Heidelberg, 2012; 11 pages.
You et al., "Hierarchical palmprint identification via multiple feature extraction", Pattern Recognition,.Pattern recognition, vol. 35, No. 4, 2002; pp. 847-859.
Lopez-Molina et al., "Multiscale edge detection based on Gaussian smoothing and edge tracking"; Knowledge-Based Systems; 2013; pp. 101-111.
Fabijańska, "Gaussian-Based Approach to Subpixel Detection of Blurred and Unsharp edges"; 22014 Federated Conference on Computer Science and Information Systems. IEEE; 2014; total 10 pages.
Zhang, D. et al., "Two novel characteristics in palmprint verification: datum point invariance and line feature matching", Journal of the Pattern Recognition Society, Pattern Recognition 32 (1999), Apr. 1, 1999, pp. 691-702.

* cited by examiner (a) (b) (c)

(a) (b) (c)

(a) (b) (c)

WRINKLE DETECTION METHOD AND ELECTRONIC DEVICE

This application is a National Stage of International Application No. PCT/CN2018/106242, filed on Sep. 18, 2018, which claims priority to Chinese Patent Application No. 201810776285.6, filed on Jul. 16, 2018, both of which are hereby incorporated by reference in their entireties.

TECHNICAL FIELD

An exemplary embodiment relates to the communications field, and, to a wrinkle detection method and an electronic device.

BACKGROUND

Severity of wrinkles on face can directly reflect people's skin age and skin health status. As one of landmark features of skin aging, wrinkles are a concern of beauty lovers.

Currently, some application programs can detect the wrinkles in a facial image of a user. However, because directions of the wrinkles in the facial image of the user are irregular, it is difficult to accurately detect the wrinkles in different directions when wrinkle detection is performed by using an existing method. Therefore, detection precision is not high.

SUMMARY

Exemplary embodiments may provide a wrinkle detection method and an electronic device, to resolve a technical problem that detection precision of an existing wrinkle detection method is not high.

According to a first aspect, an embodiment provides a wrinkle detection method. The method includes: rotating a region, in a face image, in which a wrinkle needs to be detected, to obtain a plurality of to-be-detected images; determining wrinkle points from all pixel points based on grayscale values of the pixel points in each of the to-be-detected images with different angles; then determining at least one wrinkle line from the plurality of to-be-detected images based on the determined wrinkle points; and displaying the wrinkle line in the region, in the face image, in which the wrinkle needs to be detected, where each wrinkle line indicates one wrinkle in each of the to-be-detected images, so that a wrinkle in the region, of the face image, in which the wrinkle needs to be detected can be indicated.

According to the foregoing method, wrinkles may be detected in to-be-detected images with different rotation angles. This helps improve detection precision of detecting wrinkles in different directions.

In a possible embodiment, the region, in the face image, in which the wrinkle needs to be detected, to obtain the plurality of to-be-detected images may be rotated in any one of the following embodiments.

In a first exemplary embodiment, the region, in the face image, in which the wrinkle needs to be detected may be respectively rotated according to some or all preset angles in a preset angle set, to obtain the plurality of to-be-detected images, where the preset angle set includes a plurality of preset angles, and values of the preset angles are different.

In a second exemplary embodiment, the region, in the face image, in which the wrinkle needs to be detected may be respectively rotated according to some or all preset angles in a preset angle set, to obtain a plurality of candidate images, and then the plurality of candidate images are respectively scaled down according to some or all preset proportions in a preset proportion set, to obtain the plurality of to-be-detected images, where the preset proportion set includes a plurality of preset proportions, and values of the preset proportions are different.

In a possible embodiment, the determining wrinkle points from all pixel points of the to-be-detected image includes: setting a rectangle window; then controlling, according to a specified sliding step, the rectangular window to traverse each of the to-be-detected images; determining, at each window position in which the rectangular window is located, a central pixel point located at a central position of the rectangular window, and determining a confidence value of the central pixel point based on grayscale values of all pixel points in the rectangular window, to obtain a plurality of confidence values; and using a central pixel point corresponding to a confidence value not less than a threshold as the wrinkle point, where the confidence value is used to indicate a possibility that the central pixel point is the wrinkle point. Therefore, the candidate image may be scaled down, to improve detection precision of wrinkles of different thicknesses.

In a possible embodiment, if both a length and a width of the rectangular window are N pixels, the confidence value of the central pixel point located at the central position of the rectangular window is determined according to the following formula:

$$M = \sum_{i,j=1}^{N} P_{ij} * Q_{ij},$$

where

M represents the confidence value of the central pixel point at the central position of the rectangular window, $P_{ij}$ represents an element located in row i and column j in a first matrix, and $Q_{ij}$ represents an element located in row i and column j in a second matrix, where the first matrix is a preset N×N matrix, elements in each row in the first matrix are the same, and the element in row i and column j in the second matrix is a grayscale value of a pixel point in in row i and column j in the rectangular window, where $1 \leq i \leq N$, $1 \leq j \leq N$, N is an odd number, and N is greater than or equal to 3.

In a possible embodiment, an expression of the first matrix is:

$$P = \begin{bmatrix} n_1 & n_1 & n_1 \\ n_0 & n_0 & n_0 \\ n_1 & n_1 & n_1 \end{bmatrix},$$

where

P is the first matrix, and $n_0 < n_1$; or $$P = \begin{bmatrix} n_1 & n_1 & n_1 \\ n_0 & n_0 & n_0 \\ n_1 & n_1 & n_1 \end{bmatrix},$$

where

P is the first matrix, and $n_0<n_1$; or $$P = \begin{bmatrix} n_x & n_x & n_x & \cdots & n_x \\ n_{x-1} & n_{x-1} & n_{x-1} & \cdots & n_{x-1} \\ \cdots & \cdots & \cdots & \cdots & \cdots \\ n_0 & n_0 & n_0 & \cdots & n_0 \\ \cdots & \cdots & \cdots & \cdots & \cdots \\ n_{x-1} & n_{x-1} & n_{x-1} & \cdots & n_{x-1} \\ n_x & n_x & n_x & \cdots & n_x \end{bmatrix},$$

where

P is the first matrix, $n_u > n_{u-1}$, u is an integer and $1 \leq u \leq x$, $$x = \frac{N-1}{2},$$

and N is greater than 3; or $$P = \begin{bmatrix} n_x & n_x & n_x & \cdots & n_x \\ n_{x-1} & n_{x-1} & n_{x-1} & \cdots & n_{x-1} \\ \cdots & \cdots & \cdots & \cdots & \cdots \\ n_0 & n_0 & n_0 & \cdots & n_0 \\ \cdots & \cdots & \cdots & \cdots & \cdots \\ n_{x-1} & n_{x-1} & n_{x-1} & \cdots & n_{x-1} \\ n_x & n_x & n_x & \cdots & n_x \end{bmatrix},$$

where

P is the first matrix, $n_u < n_{u-1}$, u is an integer and $1 \leq u \leq x$, $$x = \frac{N-1}{2},$$

and N is greater than 3.

In a possible embodiment, the threshold is an average value of the plurality of confidence values, so that the central pixel point of the confidence value not less than the threshold is used as the wrinkle point. This improves detection accuracy of the wrinkle point.

In a possible embodiment, the determining at least one wrinkle line from the plurality of to-be-detected images includes: determining a contour line of at least two consecutive wrinkle points in the wrinkle points; then determining straight line segments in the contour line; and using some or all of the straight line segments as the wrinkle lines.

In a possible embodiment, the determined wrinkle line meets one or more of the following conditions: a size of the wrinkle line is not less than a preset pixel size; and an included angle between a connection line of two farthest pixel points on the wrinkle line and a horizontal direction is not greater than a preset included angle.

In a possible embodiment, the displaying the at least one wrinkle line in the region includes: displaying, in the region in which the wrinkle needs to be detected, all wrinkle lines determined based on all the to-be-detected images.

In a possible embodiment, the method further includes: determining a wrinkle score based on a feature set of the displayed at least one wrinkle line and outputting the wrinkle score, where the feature set of the wrinkle line may include one or more of the following features: a length of the wrinkle line, a width of the wrinkle line, a contrast ratio value of a pixel point on the wrinkle line, and an area proportion of the wrinkle line, where the contrast ratio value is used to represent a contrast ratio of the pixel point on the wrinkle line, and the area proportion of the wrinkle line is used to represent a proportion of a quantity of pixels on the wrinkle line to a quantity of all pixels in the to-be-detected image.

In a possible embodiment, the wrinkle score may be determined according to the following formula:

$$H = A \times \omega 1 + B \times \omega 2 + C \times \omega 3 + D \times \omega 4 + \omega 5, \text{ where}$$

H is the wrinkle score, A is the length of the wrinkle line, B is the width of the wrinkle line, C is the contrast ratio value of the pixel point on the wrinkle line, D is the area proportion of the wrinkle line, $\omega 1$, $\omega 2$, $\omega 3$, and $\omega 4$ are preset parameters less than 0, and $\omega 5$ is a preset parameter.

According to a second aspect, an embodiment provides an electronic device. The electronic device is configured to implement the first aspect or any method in the first aspect, and includes corresponding functional modules respectively configured to implement steps in the foregoing method. The function may be implemented by hardware, or may be implemented by hardware by executing corresponding software, or may be implemented by using a combination of software and hardware. The hardware or the software may include one or more modules corresponding to the foregoing function.

An embodiment provides an electronic device. The electronic device includes a processor, a memory, and a display screen. The processor is coupled to the memory and the display screen. The memory is configured to store a program instruction. The processor is configured to read the program instruction stored in the memory, and implement the method according to any one of the first aspect and the possible embodiments of the first aspect in the embodiments with reference to the display screen.

According to a third aspect, an embodiment provides a computer storage medium. The computer storage medium stores a program instruction, and when the program instruction is run on an electronic device, the electronic device is enabled to perform the method according to any one of the first aspect and the possible embodiments of the first aspect.

According to a fourth aspect, an embodiment provides a computer program product. When the computer program product runs on an electronic device, the electronic device is enabled to perform the method according to any one of the first aspect and the possible embodiments of the first aspect.

According to a fifth aspect, an embodiment provides a chip. The chip is coupled to a memory in an electronic device, to control the electronic device to perform the method according to any one of the first aspect and the possible embodiments of the first aspect.

In addition, for technical effects brought by the second aspect to the fifth aspect, refer to the description in the first aspect. Details are not described herein again.

It should be noted that "coupling" in the embodiments means that two components are directly or indirectly combined with each other.

BRIEF DESCRIPTION OF DRAWINGS

FIG. 2B-1, FIG. 2B-2, FIG. 2B-3, and FIG. 2B-4 are schematic diagrams of another user interface according to an embodiment;

FIG. 3 is a schematic flowchart of a wrinkle detection method according to an embodiment;

FIG. 4 is a schematic diagram of a position of a region, in a face image, in which a wrinkle needs to be detected according to an embodiment;

DESCRIPTION OF EMBODIMENTS

It should be understood that in the embodiments, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one piece (item) of the following" or a similar expression thereof refers to any combination of these items, including any combination of a singular item (piece) or plural items (pieces). For example, at least one (piece) of a, b, or c may indicate a, b, c, a and b, a and c, b and c, or a, b, and c, where a, b, and c may be singular or plural.

The embodiments disclosed herein may be applied to an electronic device. In some embodiments, the electronic device may be a portable electronic device, such as a mobile phone, a tablet computer, a wearable device (for example, a smartwatch), or a vehicle-mounted device with a wireless communication function, that includes a function such as a personal digital assistant and/or a music player. An exemplary embodiment of the portable electronic device includes but is not limited to a portable electronic device using iOS®, Android®, Microsoft®, or another operating system. The portable electronic device may alternatively be a laptop computer with a touch-sensitive surface (for example, a touch panel). It should be further understood that, in some other embodiments, the electronic device may alternatively be a desktop computer with a touch-sensitive surface (for example, a touch panel).

Figure 1:
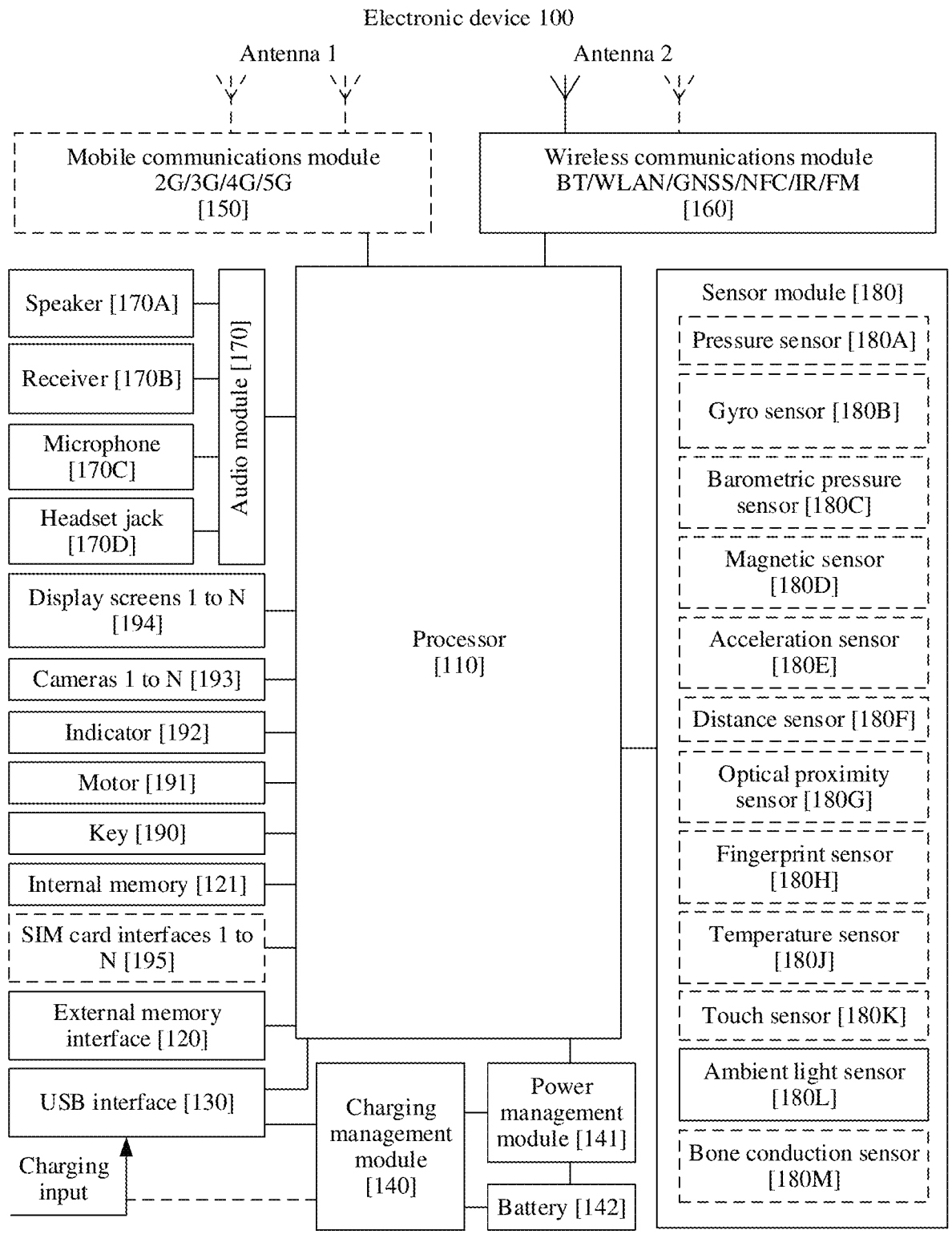
FIG. 1 is a schematic structural diagram of an electronic device to which an embodiment is applicable.

FIG. 1 is a schematic structural diagram of an electronic device 100.

The electronic device 100 may include a processor 110, an external memory interface 120, an internal memory 121, a universal serial bus (USB) interface 130, a charging management module 140, a power management module 141, a battery 142, an antenna 2, a wireless communications module 160, an audio module 170, a speaker 170A, a receiver 170B, a microphone 170C, a headset jack 170D, a sensor module 180, a key 190, a motor 191, an indicator 192, a camera 193, a display screen 194, and the like. The sensor module 180 includes an ambient light sensor 180L. In addition, the sensor module 180 may further include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, and a bone conduction sensor 180M, and the like. In some other embodiments, the electronic device 100 may further include an antenna 1, a mobile communications module 150, a subscriber identity module (subscriber identification module, SIM) card interface 195, and the like.

The processor 110 may include one or more processing units. For example, the processor 110 may include an application processor, a modem processor, a graphics processing unit (GPU), an image signal processor (ISP), a controller, a memory, a video codec, and a digital signal processor (DSP), a baseband processor, a neural network processor (neural-network processing unit, NPU), and/or the like. Different processing units may be independent components, or may be integrated into one or more processors.

In some embodiments, a memory may further be disposed in the processor 110, and is configured to store an instruction and data. For example, the memory in the processor 110 may be a cache memory. The memory may store an instruction or data that has been used or cyclically used by the processor 110. If the processor 110 needs to use the instruction or the data again, the processor 110 may directly invoke the instruction or the data from the memory, to avoid repeated access and reduce a waiting time of the processor 110. This improves system efficiency.

In some other embodiments, the processor 110 may further include one or more interfaces. For example, the interface may be a USB interface 130. For another example, the interface may further be an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, or the like. It may be understood that in the embodiments, different modules of the electronic device 100 may be connected by using the interface, so that the electronic device 100 can implement different functions, for example, photographing and processing. It should be noted that a connection manner of the interface in the electronic device 100 is not limited in the embodiments.

The USB interface 130 is an interface that conforms to a USB standard specification. For example, the USB interface 130 may include a mini USB interface, a micro USB interface, a USB type-C interface, or the like. The USB interface 130 may be configured to connect to a charger to charge the electronic device 100, or may be configured to perform data transmission between the electronic device 100 and a peripheral device. The USB interface 130 may alternatively be configured to connect to a headset to play audio by using the headset. The interface may further be configured to connect to another electronic device such as an AR device.

The charging management module 140 is configured to receive a charging input from the charger. The charger may be a wireless charger or a wired charger. In some embodiments of wired charging, the charging management module 140 may receive a charging input of the wired charger by using the USB interface 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display screen 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in the same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover a single communications frequency band or a plurality of communications frequency bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including 2G/3G/4G/5G and the like. The mobile communications module 150 may include at least one filter, a switch, a power amplifier, a low noise amplifier (LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules in the mobile communications module 150 may be disposed in the processor 110. In some embodiments, at least some function modules in the mobile communications module 150 may be disposed in the same component as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in the same component with the mobile communications module 150 or another function module.

The wireless communications module 160 may provide a solution, applied to the electronic device 100, to wireless communication such as a wireless local area network (WLAN) (for example, a wireless fidelity (Wi-Fi) network), Bluetooth, a global navigation satellite system (GNSS), frequency modulation (FM), a near field communication (NFC) technology, or an infrared (IR) technology. The wireless communications module 160 may be one or more components integrating at least one communications processor module. The wireless communications module 160 receives an electromagnetic wave signal by using the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), bluetooth, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display screen 194, the application processor, and the like. The GPU is a microprocessor for image processing, and connects the display screen 194 to the application processor. The GPU is configured to perform mathematical and geometric computation, and is configured to render an image. The processor 110 may include one or more GPUs that execute a program instruction to generate or change display information.

The display screen 194 is configured to display an image, a video, and the like. The display screen 194 includes a display panel. The display panel may use a liquid crystal display (LCD), an organic light-emitting diode (OLED), an active-matrix organic light emitting diode (AMOLED), a flexible light-emitting diode (flex light-emitting diode, FLED), a Miniled, a MicroLed, a Micro-oLed, a quantum dot light emitting diode (QLED), or the like. In some embodiments, the electronic device 100 may include one or N display screens 194, where N is a positive integer greater than 1.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is pressed, a ray of light is transmitted to a light-sensitive element of the camera through a lens, and an optical signal is converted into an electrical signal. The light-sensitive element of the camera transmits the electrical signal to the ISP for processing and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An object is projected to the light-sensitive element through the lens to generate an optical image. A light-sensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The DSP is configured to process a digital signal. In addition to a digital image signal, the DSP may further process another digital signal. For example, when the electronic device 100 selects a frequency, the DSP is configured to perform Fourier transform on frequency energy and the like.

The video codec is configured to compress or decompress a digital video. The electronic device 100 can support one or more video codecs. In this way, the electronic device 100 can play back or record videos in a plurality of coding formats, for example, moving picture experts group (MPEG) 1, MPEG 2, MPEG 3, and MPEG 4.

The NPU is a neural-network computing processor, quickly processes input information by referring to a structure of a biological neural network, for example, by referring to a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card (such as a Micro SD card), to extend a storage capability of the electronic device 100. The external memory card communicates with the processor 110 by using the external memory interface 120, to implement a data storage function, for example, store files such as music and a video into the external memory card.

The internal memory 121 may be configured to store computer-executable program code, and the executable program code includes an instruction. The processor 110 runs the instruction stored in the internal memory 121, to implement various function applications and data processing of the electronic device 100. The internal memory 121 may include a program storage area and a data storage area. The program storage area may store an operating system, an application required by at least one function (for example, a voice play function or an image play function), and the like. The data storage area may store data (such as audio data and an address book) created in a use process of the electronic device 100, and the like. In addition, the internal memory 121 may include a high-speed random access memory, and may further include a non-volatile memory, for example, at least one magnetic disk storage device, a flash memory device, or a universal flash storage (UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output and is also configured to convert an analog audio input into a digital audio signal. The audio module 170 may further be configured to encode and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mic" or a "sound conducting device", is configured to convert a sound signal into an electrical signal. When making a call or sending a voice message, a user may make a sound near the microphone 170C through the mouth of the user to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, and further identify a sound source, implement a directional recording function, and the like.

The headset jack 170D is configured to connect to a wired headset. The headset jack 170D may be a USB interface 130 or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display screen 194, the electronic device 100 detects intensity of the touch operation by using the pressure sensor 180A. The electronic device 100 may also calculate a touch location based on a detection signal of the pressure sensor 180A. In some embodiments, touch operations that are performed at the same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of a flip cover is set based on a detected opening or closing state of the leather case or a detected opening or closing state of the flip cover.

The acceleration sensor 180E may detect magnitude of accelerations in various directions (usually on three axes) of the electronic device 100 and may detect magnitude and a direction of gravity when the electronic device 100 is still. The acceleration sensor 180E may further be configured to identify a posture of the electronic device and is applied to an application such as switching between landscape orientation and portrait orientation or a pedometer.

The distance sensor 180F is configured to measure a distance. The electronic device 100 may measure the distance in an infrared or a laser manner. In some embodiments, in a photographing scenario, the electronic device 100 may use the distance sensor 180F to measure a distance to implement quick focusing.

The optical proximity sensor 180G may include, for example, a light emitting diode (LED) and an optical detector such as a photodiode. The LED may be an infrared LED. The electronic device 100 emits infrared light by using the LED. The electronic device 100 uses the photodiode to detect infrared reflected light from an object nearby. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, so that the electronic device 100 automatically turns off the screen to save power. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, accessing an application lock, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is below another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display screen 194, and the touch sensor 180K and the display screen 194 constitute a touchscreen. The touch sensor 180K is configured to detect a touch operation on or near the touch sensor 180K. The touch sensor may transfer the detected touch operation to the application processor to determine a type of a touch event. A visual output related to the touch operation may be provided by using the display screen 194. In some other embodiments, the touch sensor 180K may also be disposed on a surface of the electronic device 100 at a location different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The key 190 may include a power key, a volume key, and the like. The key 190 may be a mechanical key or may be a touch key. The electronic device 100 may receive a key input and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations applied to different areas of the display screen 194. Different application scenarios (for example, a time reminder, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a Nano-SIM card, a Micro-SIM card, a SIM card, and the like. A plurality of cards may be inserted into the same SIM card interface 195 at the same time. The plurality of cards may be of the same type or different types. The SIM card interface 195 may also be compatible with different types of SIM cards. The SIM card interface 195 may further be compatible with an external memory card. The electronic device 100 interacts with a network by using the SIM card, to implement functions such as conversation and data communication. In some embodiments, the electronic device 100 uses an eSIM, namely, an embedded SIM card. The eSIM card may be embedded into the electronic device 100 and cannot be separated from the electronic device 100.

It may be understood that an exemplary structure in this embodiment does not constitute a specific limitation on the electronic device 100. In some other embodiments, the electronic device 100 may include more or fewer components than those shown in the figure, or some components may be combined, or some components may be split, or different component arrangements may be used. The components in the figure may be implemented by using hardware, software, or a combination of software and hardware.

The following describes the embodiments in detail by using the electronic device 100 as an example.

In addition, it should be understood that the application program supported by the electronic device in the embodiments may include a photographing application, for example, a camera. In addition, the application program supported by the electronic device may further include a plurality of other applications, for example, drawing, a game, a phone, a video player, a music player, photo management, a browser, a calendar, and a clock.

The application supported by the electronic device in the embodiments may further include an application used for skin test. The application used for skin test is to detect a photographed face image to obtain a facial skin feature of a user (for example, a wrinkle, a pore, a blackhead, a speckle, or a red zone of a facial skin), and may provide a detection result report for the user. For example, the detection result report may include, but is not limited to, a score of each feature on the facial skin, comprehensive analysis on the facial skin, and the like, and may further display the face image of the user, and mark a corresponding problem on the face image based on a detection result of each feature, for example, a blackhead is marked in a bulb region of a nose, a wrinkle is marked in a forehead region, and a speckle is marked in a cheek region. It may be understood that the detection result report may be presented to the user by using a user interface. For example, the detection result report may be a user interface 200 shown in FIG. 2A, and includes a comprehensive score, a skin age, and scores of a pore, a blackhead, a fine line, a speckle, and a red zone. In some other embodiments, the user interface 200 may further include a virtual key 201, a virtual key 202, a virtual key 203, a virtual key 204, and a virtual key 205. The virtual key 201 is used as an example. The electronic device 100 displays an exemplary care suggestion for the pore on the display screen 194 in response to an operation on the virtual key 201. For functions of the virtual key 202, the virtual key 203, the virtual key 204, and the virtual key 205, refer to functions of the virtual key 201. Details are not described herein again.

To enable the electronic device to detect the facial skin of the user more accurately, for example, in a user skin test solution in the embodiments, a photographing condition detection module, an image quality detection module, a region of interest (ROI) detection module, a skin feature detection module, a result analysis module, and the like may be integrated into the processor 110. In some embodiments, the photographing condition detection module, the image quality detection module, the ROI detection module, the skin feature detection module, the result analysis module, and the like may be integrated into the application processor in the processor 110. In some other embodiments, an artificial intelligence (AI) chip is integrated into the processor 110, and the photographing condition detection module, the image quality detection module, the ROI detection module, the skin feature detection module, the result analysis module, and the like are integrated into the AI chip, to implement user skin test.

The photographing condition detection module may detect a current photographing condition, to indicate the user to photograph under a required photographing condition, to ensure that a photographed image meets a requirement. This ensures accuracy of skin test based on the image. For example, the required photographing condition includes: sufficient ambient light, a proper distance (for example, about 25 cm) between a face and an electronic device, a face being upright, an eye being opened and closed, no glasses being worn, fringe-free on a forehead as much as possible, accurate focusing, no obvious jitter, and the like.

After the photographing condition detection module successfully performs detection, the processor 110 enables intelligent light compensation. For example, when the current photographing condition meets the requirement, the photographing condition detection module determines that the detection succeeds. For example, in the embodiments, the electronic device may use different light compensation modes (for example, a flash mode or a flashlight mode) to project light on a face of the user, to meet requirements of detecting different facial skin features. After the light is projected on the face of the user, the processor 110 may control the camera 193 to photograph the face of the user to obtain a face image of the face of the user.

The image quality detection module may detect quality of the face image, to ensure that the photographed image meets requirements of detecting different facial skin features.

After the image quality detection module detects that the quality of the image meets the requirement, the ROI detection module may determine a to-be-detected ROI from the face image. For example, an ROI of a blackhead is a small region on a bulb of a nose.

The skin feature detection module may separately detect facial skin features in the determined ROI, for example, detect a wrinkle, a pore, a blackhead, a speckle, a red zone, and an oil output degree of the skin.

The result analysis module may analyze a detection result of the facial skin feature obtained through detection by the skin feature detection module, and give a score, score ranking, and the like of each detection item for each skin feature.

In addition, in some embodiments, the processor 110 may further integrate an image preprocessing module. The image preprocessing module may perform compression, cropping, and the like on the photographed face image, so that the ROI detection module, the skin feature detection module, and the like perform subsequent processing.

To output an analysis result of the face image, output the score of each detection item, or the like, the processor 110 may further display a detection report obtained through detection (including a region, in a face image, of a detection result of each feature, for example, a blackhead is marked in a bulb region of a nose, and a wrinkle is marked in a forehead region, a speckle is marked in a cheek region, and the like, and a score of each detection item) on the display screen 194 for the user to view. This improves user experience.

In conclusion, to improve accuracy of wrinkle detection, an embodiment provides a wrinkle detection method. In the method, the electronic device 100 may rotate a region, in a face image, in which a wrinkle needs to be detected, to obtain a plurality of to-be-detected images, and then wrinkles in different to-be-detected images are respectively detected. Because rotation angles of the different to-be-detected images are different, wrinkle detection is separately performed on the plurality of to-be-detected images, so that detection accuracy of wrinkles in different directions can be improved. p The wrinkle detection method provided in this embodiment may be applied to an application program that is used for skin test and that is supported by the electronic device 100. For example, as shown in FIG. 2B-1, FIG. 2B-2, FIG. 2B-3, and FIG. 2B-4, the display screen 194 of the electronic device 100 displays an icon 206 of a skin test application, as well as icons for other applications, such as, for example, a camera icon 207 for a camera application. If the electronic device 100 detects an operation on the icon 206 (for example, the electronic device detects that a user taps the icon 206), and in response to the operation on the icon 206, a user interface 208 of the skin test application is displayed on the display screen 194. The user interface 710 of the skin test application includes a virtual key 209 (in implementation, the virtual key may be named "test", "photograph", or the like). If the electronic device 100 detects an operation on the virtual key 209 (for example, the electronic device detects that a user taps the virtual key 209), and in response to the operation on the virtual key 209, wrinkle detection is performed on a region, in a face image, in which a wrinkle needs to be detected according to the wrinkle detection method provided in this embodiment.

The face image may be obtained by the electronic device 100 in response to the operation on the virtual key 209 by photographing, by using the camera 193, a face of a user who uses the electronic device 100. The camera 193 herein may be a front-facing camera of the electronic device 100, or to improve photographing quality, when a pixel of the front-facing camera is lower than a pixel of a rear-facing camera, the camera 193 may also be a rear-facing camera of the electronic device 100. Alternatively, the face image may be an image that is read, by the electronic device 100 in response to the operation on the virtual key 209, from the internal memory 121 or from the external memory by using the external memory interface 120. In this case, the face image may be a face image that is photographed in advance and stored in the internal memory 121 or the external memory.

For example, the face image may be an image obtained by the electronic device by photographing the face of the user by using the camera 193 (the camera 193 herein may be a front-facing camera or a rear-facing camera). After photographing, the electronic device 100 stores the obtained face image in the internal memory 121, and after the electronic device 100 detects the operation on the virtual key 209, the electronic device 100 may read the face image from the internal memory 121. In addition, in implementation, the face image stored in the internal memory 121 may also be an image received by the electronic device 100 by using the mobile communications module 150 and/or the wireless communications module 1160.

Further, after the electronic device 100 detects the operation on the virtual key 209, the user may further select whether the electronic device 100 performs photographing by using the camera 193 to obtain the face image, or the electronic device 100 reads the face image from the internal memory 121 or the external memory. For example, after the electronic device 100 detects the operation on the virtual key 209, the display screen 194 displays a photo selection region 212. The photo selection region 212 may include prompt information such as "how to select a photo" and "where to obtain a photo", to remind the user to select a source of the face image. The photo selection region 212 may further include a plurality of virtual keys, and the virtual key is used to perform, by using an operation performed by the user on the virtual key, an operation corresponding to the virtual key, to obtain the face image in different manners. For example, the virtual key may be a first key 213 (a name of the first key 213 may be "shoot", "photograph", or the like) that indicates that the face image is obtained in a photographing manner, and the virtual key may be a second key 214 (a name of the second key 214 may be "storage", "album", or the like) that indicates that the face image is obtained by reading from the memory. After detecting the operation performed by the user on the first key 213, the electronic device 100 may photograph, by using the camera 193, a facial image of the user in response to the operation performed by the user on the first key 213, and the facial image is used as the face image. After detecting the operation performed by the user on the second key 214, the electronic device 100 may continue to prompt the user to select a storage path of the face image, and read, from the storage path selected by the user, an image selected by the user as the face image. The storage path may be a default storage path of an "album" of the electronic device 100. The storage path may include a storage path of the internal memory 121 or may be a storage path of external storage. In addition, it should be understood that the displaying in the photo selection region 212 may also be triggered in a manner other than the operation on the virtual key 209 detected by the electronic device 100. For example, a new functional virtual key may be set on the user interface 208, so that after detecting an operation on the new functional virtual key, the electronic device 100 displays the photo selection region 212.

After the face image of the user is obtained by using the foregoing method, the display screen 194 may display a face image preview interface 210 and display the face image in a preview region 211 on the face image preview interface 210. The electronic device 100 may determine an ROI in which wrinkle detection is performed based on the face image in the preview region 211, and uses the ROI as a region, in the face image, in which a wrinkle needs to be detected, to detect the wrinkle by using the wrinkle detection method provided in the embodiments.

The following describes in detail how the processor 110 in the electronic device 100 specifically implements wrinkle detection on the face image based on the images obtained in the foregoing different manners. For details, refer to FIG. 3. The following steps may be included.

In step S101, the processor 110 rotates a region, in the obtained face image, in which a wrinkle needs to be detected, to obtain a plurality of to-be-detected images.

In step S102, the processor 110 determines wrinkle points from all pixel points of each of the to-be-detected images based on grayscale values of the pixel points in each of the to-be-detected images.

In step S103, the processor 110 determines at least one wrinkle line from the plurality of to-be-detected images based on the wrinkle points, where each wrinkle line is used to indicate one wrinkle in each of the to-be-detected images.

Figure 17:
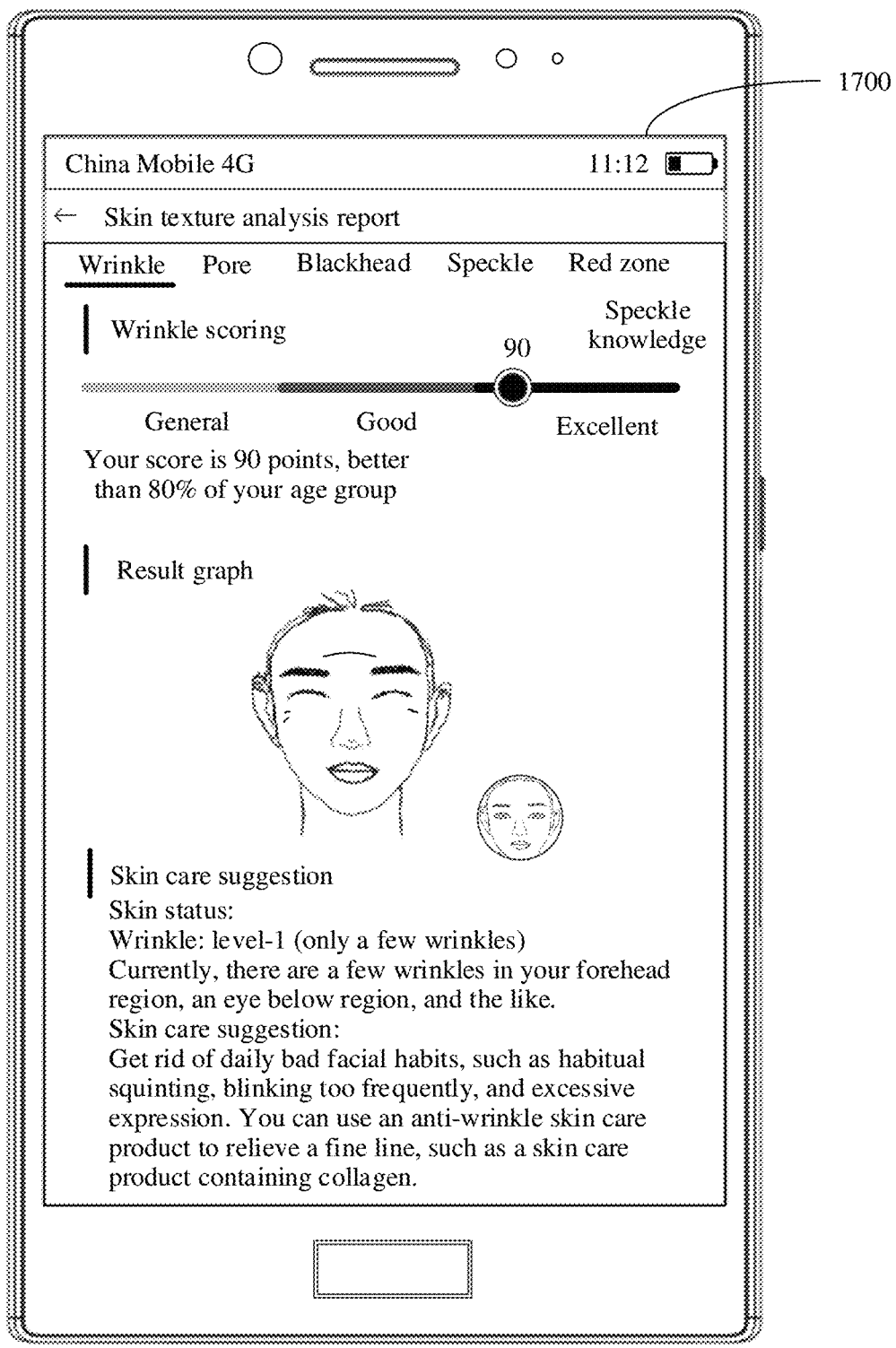
FIG. 17 is a schematic diagram of a wrinkle detection result report page according to an embodiment.

In step S104, the processor 110 displays the detected face image on the display screen 194, and displays the at least one wrinkle line in a corresponding region of the face image, which is shown in FIG. 17 below, and is described in detail in FIG. 17.

It should be understood that the steps shown in S101, S102, and S103 may be implemented by the processor 110 of the electronic device 100 by executing the program code in the internal memory 121.

It should be understood that the region in which the wrinkle needs to be detected in this embodiment may be a common region of wrinkles on a face. For example, at least one of the following regions in a face image shown in FIG. 4 may be used as the region in which the wrinkle needs to be detected: a forehead region 401, an eye below region 402, an eye corner region 403, a region 404 extending downward from a nose wing, an eyebrow region 405, and the like.

In an implementation, an ROI of the wrinkle in the face image may be determined based on a region of interest detection function, and the ROI of the wrinkle is used as the region in which the wrinkle needs to be detected. For example, the ROI of the wrinkle is extracted from at least one of the forehead region 401, the eye below region 402, the eye corner region 403, the region 404 extending downward from the nose wing, or the eyebrow region 405 in the face image by compressing and cropping the image, and is used as the region in which the wrinkle needs to be detected. For example, according to the eye below region 402 shown in FIG. 4, an ROI of a wrinkle shown by (a) in FIG. 5 may be extracted and used as the region in which the wrinkle needs to be detected. Alternatively, according to the forehead region 401 shown in FIG. 4, an ROI of a wrinkle shown by (b) in FIG. 5 may be extracted and used as the region in which the wrinkle needs to be detected.

The to-be-detected image in step S101 may be an image with a normal color obtained after a face image with a normal color is rotated. In this case, in step S102 the processor 110 may perform color processing on the to-be-detected images, to determine the grayscale values of the pixel points in the to-be-detected images. Alternatively, the to-be-detected image may be a grayscale image obtained after a face image with a normal color is rotated and color processing is performed. Each pixel point in the grayscale image may be represented by a grayscale value. In this case, in step S102, the processor 110 may directly determine the grayscale value of each pixel point based on the grayscale image.

In the implementation of step S101, the processor 110 may obtain the plurality of to-be-detected images by rotating the region, in the face image, in which the wrinkle needs to be detected in a plurality of manners. The following uses several feasible embodiments as examples for description.

In a first exemplary embodiment, rotate, according to some or all preset angles in a preset angle set, the region in which the wrinkle needs to be detected, to obtain the plurality of to-be-detected images.

For example, the region, in the face image, in which the wrinkle needs to be detected may be respectively rotated according to some or all preset angles in the preset angle set, and a plurality of images obtained through rotation are used as the to-be-detected images. The preset angle set may include a plurality of preset angles, and values of any two preset angles may be different. It should be understood that the preset angle may represent an actual rotation angle of the region in which the wrinkle needs to be detected. A value of the preset angle may be between [−180, 180]° (degree). For example, the preset angle may be 90°. A value of the preset angle may alternatively not be between [−180, 180]°. For example, the preset angle is 270°, and it indicates that the region in which the wrinkle needs to be detected actually rotates by 270°.

In implementation, a positive numeric symbol or a negative numeric symbol of the preset angle in the preset angle set may further be used to indicate a rotation direction when the region in which the wrinkle needs to be detected is rotated. For example, the rotation direction of the region in which the wrinkle needs to be detected may be indicated in the following manner: If the numeric symbol of the preset angle is positive, it may indicate that the region in which the wrinkle needs to be detected is rotated clockwise; or if the numeric symbol of the preset angle is negative, it may indicate that the region in which the wrinkle needs to be detected is rotated clockwise. Alternatively, in this embodiment, it is not excluded that the following manner is used to indicate the rotation direction when the region in which the wrinkle needs to be detected is rotated: if a value of the preset angle in the preset angle set is negative, it may indicate that the region in which the wrinkle needs to be detected is rotated clockwise; or if a value of the preset angle is positive, it may indicate that the region in which the wrinkle needs to be detected is rotated clockwise.

Figure 5:
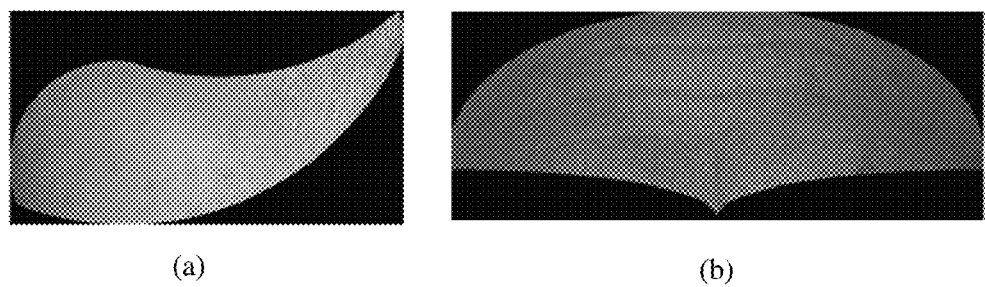
FIG. 5 is a schematic diagram of a region in which a wrinkle needs to be detected according to an embodiment.
Figure 6:
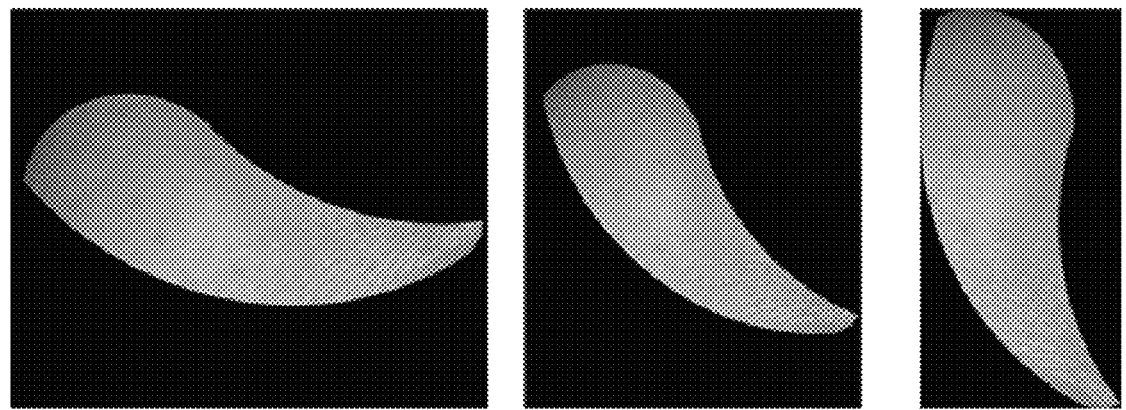
FIG. 6 is a schematic diagram of an effect of rotating a region in which a wrinkle needs to be detected according to an embodiment.

For example, the extracted region in which the wrinkle needs to be detected is the region shown by (a) in FIG. 5. If the preset angle set includes three preset angles: 30°, 60°, and 90°. In implementation of step S101, the region shown by (a) in FIG. 5 may be rotated by 30°, to obtain an image shown by (a) in FIG. 6, the region shown by (a) in FIG. 5 is rotated by 60°, to obtain an image shown by (b) in FIG. 6, and the region shown by (a) in FIG. 5 is rotated by 90°, to obtain an image shown by (c) in FIG. 6, so that the image shown by (a) in FIG. 6, the image shown by (b) in FIG. 6, and the image shown by (c) in FIG. 6 are the to-be-detected images. In addition, in implementation, the preset angle may further be set to 0°.

In addition, the preset angle in the preset angle set may further be set according to a position of the region in which the wrinkle needs to be detected in the face image. For example, because wrinkles in the forehead region are mostly distributed a horizontal direction or a vertical direction, preset angles in a preset angle set for wrinkle detection of the forehead region shown by (b) in FIG. 5 may include 0° and 90°. For example, to-be-detected image includes the to-be-detected image (which may be considered as an image obtained after the region in which the wrinkle needs to be detected is rotated by 0°) and an image obtained after the region in which the wrinkle needs to be detected is rotated by 90° (clockwise rotation by 90° or counterclockwise rotation by 90°).

In a second exemplary embodiment, rotate, according to some or all preset angles in a preset angle set, the region in which the wrinkle needs to be detected, and respectively scale down according to some or all preset proportions in a preset proportion set, to obtain the plurality of to-be-detected images.

For example, the region, in the face image, in which the wrinkle needs to be detected may be respectively rotated according to the some or all preset angles in the preset angle set, to obtain a plurality of candidate images. For a manner of setting the preset angle set and the preset angle herein, refer to the implementation of the foregoing first exemplary embodiment. Then, the plurality of candidate images may be respectively scaled down according to the some or all preset proportions in the preset proportion set, to obtain the plurality of to-be-detected images. The to-be-detected image may include the candidate image, the preset proportion set includes a plurality of preset proportions, and values of the preset proportions are different. The preset proportion may represent a proportion relationship between a size of the candidate image before scaling down and a size of the to-be-detected image obtained after scaling down. For example, the preset proportion may be a value less than or equal to 1. It should be understood that the scaling down herein may mean that the image is scaled down proportionally without changing a length-width ratio of the image.

For example, each candidate image obtained by rotating the region in which the wrinkle needs to be detected may be respectively scaled down according to some or all preset proportions in the preset proportion set, to obtain the plurality of to-be-detected images. For example, if one of the candidate images obtained after the region in which the wrinkle needs to be detected is rotated according to the preset angle in the preset angle set is an image shown by (a) in FIG. 7, and it is assumed that the preset proportions in the preset proportion set are 0.5 and 0.3, in this case, the image shown by (a) in FIG. 7 may be scaled down according to the preset proportion of 0.5 to obtain an image shown by (b) in FIG. 7, and the image shown by (a) in FIG. 7 may be scaled down according to the preset proportion of 0.3 to obtain an image shown by (c) in FIG. 7, so that the image shown by (b) in FIG. 7 and the image shown by (c) in FIG. 7 may be used as the to-be-detected images. In addition, in implementation, the candidate image shown by (a) in FIG. 7 may further be used as the to-be-detected image.

In implementation, after the region in which the wrinkle needs to be detected is rotated according to the preset angle in the preset angle set, a plurality of candidate images may be obtained. For example, the candidate images may be the image shown by (a) in FIG. 6, the image shown by (b) in FIG. 6, and the image shown by (c) in FIG. 6. In this case, the image shown by (a) in FIG. 6 may be respectively rotated according to the preset proportion of 0.5 and the preset proportion of 0.3 to obtain two images, the image shown by (b) in FIG. 6 may be respectively rotated according to the preset proportion of 0.5 and the preset proportion of 0.3 to obtain two images, and the image shown by (c) in FIG. 6 may be respectively rotated according to the preset proportion of 0.5 and the preset proportion of 0.3 to obtain two images. The image shown by (a) in FIG. 6, the image shown by (b) in FIG. 6, and the image shown by (c) in FIG. 6 and a plurality of images obtained by rotating the image shown by (a) in FIG. 6, the image shown by (b) in FIG. 6, and the image shown by (c) in FIG. 6 are used as the to-be-detected images.

Figure 7:
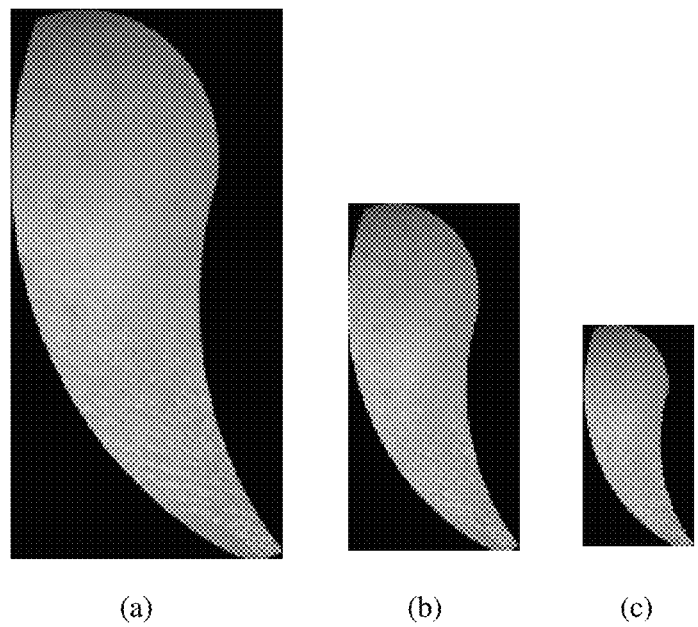
FIG. 7 is a schematic diagram of an effect of scaling down a region in which a wrinkle needs to be detected according to an embodiment.
Figure 8:
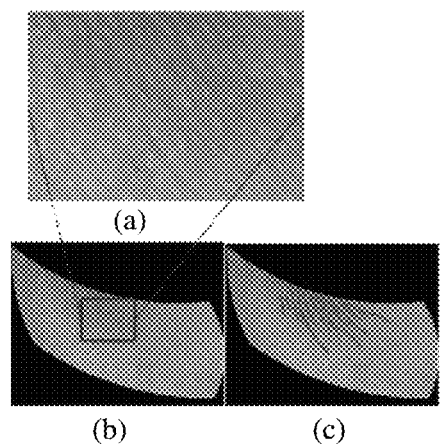
FIG. 8 is a schematic diagram of an effect of detecting a wrinkle line in a scaled-down region in which a wrinkle needs to be detected according to an embodiment.

Because a grayscale value of a region having the wrinkle is lower than that of a region not having the wrinkle in the grayscale image (in other words, a color of the region having the wrinkle is darker), and after the region is scaled up according to a preset proportion greater than 1, contrast between a bright region and a dark region in the grayscale image is not obvious than contrast between a bright region and a dark region in the grayscale image before the region is scaled up. For example, for a relatively thick wrinkle, grayscale values of pixel points in the region having the wrinkle are slightly different, so that it is more difficult to accurately detect a wrinkle point in the scaled-up grayscale image. Therefore, to improve accuracy of wrinkle detection, the wrinkle may be detected in a grayscale image that is scaled down according to a proportion less than 1. For example, a grayscale image shown by (a) in FIG. 8 is a grayscale image obtained after a part of a grayscale image shown by (b) in FIG. 8 is scaled up, it can be seen that in the grayscale image shown by (a) in FIG. 8, contrast between a bright region and a dark region is not obvious, and it is difficult to determine a position of a wrinkle point based on the grayscale image. However, contrast between a bright region and a dark region in the grayscale image shown by (b) in FIG. 8 is more obvious, and therefore the position of the wrinkle point is easily be determined based on the image shown by (b) in FIG. 8 (equivalent to the grayscale image obtained after the grayscale image shown by (a) in FIG. 8 is scaled down according to the preset proportion less than 1). A dark line in an image shown by (c) in FIG. 7 represents a position of the wrinkle in an image shown by (b) in FIG. 7.

In the foregoing second exemplary embodiment, the wrinkle in the region in which the wrinkle needs to be detected may be detected based on the to-be-detected image obtained by scaling down the candidate image. Because the candidate image in the to-be-detected image is scaled down according to a proportion less than 1, contrast between the bright region and the dark region in the image can be more obvious, and the wrinkle point in the to-be-detected image can be more accurately determined. This helps more accurately detect wrinkles of different thicknesses.

In an implementation, the processor 110 may determine the wrinkle point according to the following method: setting a rectangular window; controlling, according to a sliding step, the rectangular window to traverse each of the to-be-detected image; determining, at each window position in which the rectangular window is located, a central pixel point located at a central position of the rectangular window, and determining a confidence value of the central pixel point based on grayscale values of all pixel points in the rectangular window, to obtain a plurality of confidence values; and using a central pixel point corresponding to a confidence value not less than a threshold as the wrinkle point, where the confidence value is used to indicate a possibility that the central pixel point is the wrinkle point. In implementation, the sliding step may be set to one pixel. For example, the rectangular window is controlled to move one pixel point in a horizontal direction or a vertical direction each time, to traverse each of the to-be-detected images and determine confidence values corresponding to all pixel points in each of the to-be-detected images.

Figure 9:
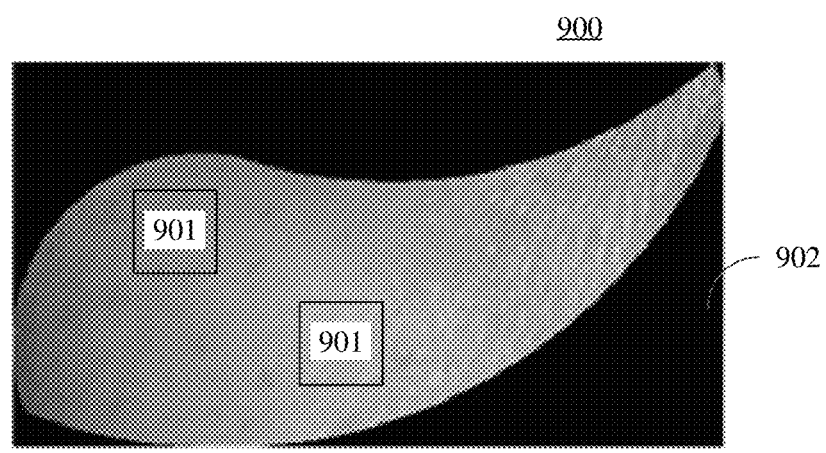
FIG. 9 is a schematic diagram of a rectangular window according to an embodiment.

In an exemplary embodiment, the rectangular window may be set to a square formed by N×N pixels, where N is an odd number greater than 1, for example, N is set to 3 or N is set to 5, so that both a quantity of rows and a quantity of columns of the rectangular window are N. As shown in FIG. 9, a set rectangular window 901 may traverse a to-be-detected image 900 and determine a confidence value of a center pixel point of the rectangular window 901 when the rectangular window 901 is located at each window position.

The threshold in step S102 may be a preset value, for example, 0 or 400. It should be understood that a smaller threshold indicates a larger quantity of wrinkle points determined according to the foregoing method. In an exemplary embodiment, a smaller threshold indicates higher wrinkle detection sensitivity. However, if the threshold is excessively small, the determined wrinkle point may be located in a black area 902 (a grayscale value of a pixel point in the black area is generally 0) in the to-be-detected image 900 shown in FIG. 9. In this case, the wrinkle point cannot be used to indicate a wrinkle position. Therefore, an average value of confidence values of center pixel points at the plurality of window positions that are determined after the to-be-detected image is traversed may be used as the threshold, or an average value of non-zero confidence values of center pixel points at the plurality of determined window positions may be used as the threshold, to improve wrinkle detection accuracy. It may be understood that increasing a value of the threshold may increase a grayscale value difference between the selected wrinkle point and a surrounding pixel point. This improves accuracy of wrinkle point detection.

In a possible embodiment, if both a length and a width of the rectangular window are N pixels, the electronic device 100 may determine the confidence value of the central pixel point according to the following formula (1):

$$M = \sum_{i,j=1}^{N} P_{ij} * Q_{ij} \quad (1)$$

M represents the confidence value of the central pixel point at the central position of the rectangular window, $P_{ij}$ represents an element located in row i and column j in a first matrix, and $Q_{ij}$ represents an element located in row i and column j in a second matrix, where the first matrix is a preset N×N matrix, elements in each row in the first matrix are the same, and the element in row i and column j in the second matrix is a grayscale value of a pixel point in row i and column j in the rectangular window, where $1 \leq i \leq N$, $1 \leq j \leq N$, N is an odd number, and N is greater than or equal to 3.

In an exemplary embodiment, an element in the second matrix may include grayscale values of all pixels in the rectangular window. For example, if the rectangular window is a square including N×N pixels, the second matrix may be an N×N matrix, and a value of each pixel position in the second matrix may be a grayscale value of a corresponding position in the second matrix. For example, a value of $Q_{11}$ in the second matrix may be a grayscale value of a pixel point in row 1 and column 1 in the rectangular window.

In addition, a quantity N of rows and a quantity N of columns of the first matrix may be the same as a quantity N of pixel rows and a quantity N of columns of the rectangular window. For example, a size of the rectangular window is 3×3 pixels, and the first matrix is a 3×3 matrix.

For example, if N=3, the first matrix P may have the following expression:

$$P = \begin{bmatrix} n_1 & n_1 & n_1 \\ n_0 & n_0 & n_0 \\ n_1 & n_1 & n_1 \end{bmatrix} \quad (2)$$

In formula (2), $n_0 > n_1$; or $n_0 < n_1$.

If N=5, the first matrix P may further have an expression shown in formula (3):

$$P = \begin{bmatrix} n_x & n_x & n_x & \cdots & n_x \\ n_{x-1} & n_{x-1} & n_{x-1} & \cdots & n_{x-1} \\ \cdots & \cdots & \cdots & \cdots & \cdots \\ n_0 & n_0 & n_0 & \cdots & n_0 \\ \cdots & \cdots & \cdots & \cdots & \cdots \\ n_{x-1} & n_{x-1} & n_{x-1} & \cdots & n_{x-1} \\ n_x & n_x & n_x & \cdots & n_x \end{bmatrix} \quad (3)$$

In formula (3), $n_u > n_{u-1}$, u is an integer and $1 \leq u \leq x$, $$x = \frac{N-1}{2},$$

and N is greater than 3; or $n_u < n_{u-1}$, u is an integer and $1 \leq u \leq x$, $$x = \frac{N-1}{2},$$

and N is greater than 3.

In a feasible manner, the first matrix P may have the following expression:

$$P = \begin{bmatrix} 1 & 1 & 1 & 1 & 1 \\ 0 & 0 & 0 & 0 & 0 \\ -2 & -2 & -2 & -2 & -2 \\ 0 & 0 & 0 & 0 & 0 \\ 1 & 1 & 1 & 1 & 1 \end{bmatrix} \quad (4)$$

The following uses an example to describe a manner of determining the confidence value of the center pixel point of the rectangular window in the embodiments. If a size of the rectangular window 901 is 5×5 pixels, and when the rectangular window 901 slides to a specific window position, grayscale values of pixel points in the rectangular window 901 are shown in Table 1. It may be contemplated that, when the rectangular window 901 is at the window position, a grayscale value of a center pixel (a pixel point whose quantity of rows and quantity of columns are both 3) is 110.

TABLE 1

Table of statistics on grayscale values of pixel points in the rectangular window 901

| | Quantity of rows | | | | |
|---|---|---|---|---|---|
| Quantity of columns | 1 | 2 | 3 | 4 | 5 |
| 1 | 150 | 150 | 150 | 150 | 150 |
| 2 | 140 | 140 | 140 | 140 | 140 |
| 3 | 110 | 110 | 110 | 110 | 110 |
| 4 | 140 | 140 | 140 | 140 | 140 |
| 5 | 150 | 150 | 150 | 150 | 150 |

According to Table 1, an expression of the second matrix Q may be set to:

$$Q = \begin{bmatrix} 150 & 150 & 150 & 150 & 150 \\ 140 & 140 & 140 & 140 & 140 \\ 110 & 110 & 110 & 110 & 110 \\ 140 & 140 & 140 & 140 & 140 \\ 150 & 150 & 150 & 150 & 150 \end{bmatrix} \quad (5)$$

In formula (5), a value of a pixel (i, j) in the second matrix is a grayscale value of a pixel point located in row i and column j in the rectangular window 901 shown in Table 1.

Then, the processor 110 may determine the confidence value of the center pixel point of the rectangular window 901 according to the expression of the first matrix P shown in formula (4) and the expression of the second matrix Q shown in formula (5) by using formula (1).

Figure 10:
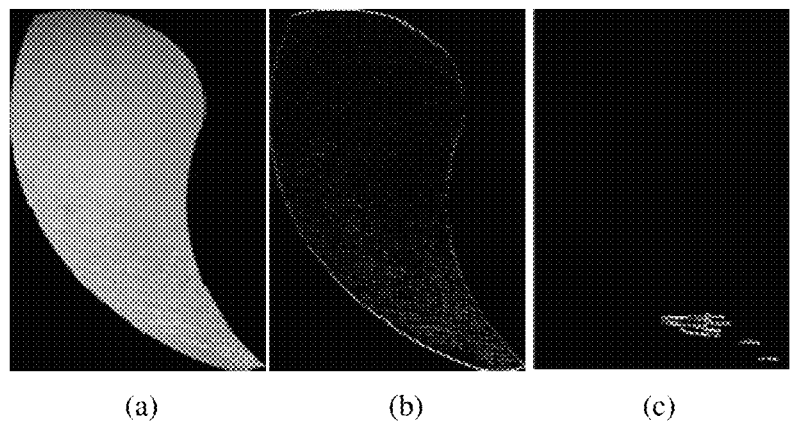
FIG. 10 is a schematic diagram of determining a wrinkle line based on a contour line of wrinkle points according to an embodiment.

For example, by using the foregoing wrinkle point detection method, a position of the wrinkle point, shown by (a) in FIG. 10 and determined by the processor 110, in the to-be-detected image may be shown by a white bright spot in an image shown by (b) in FIG. 10.

After performing the foregoing processing, the processor 110 may determine a contour line of at least two consecutive wrinkle points in the to-be-detected image, then determine straight line segments included in the contour line, and use some or all of the straight line segments as the wrinkle lines. In implementation, the contour line in the to-be-detected image may be extracted by using a contour extraction technology.

FIG. 10 is still used as an example. The processor 110 may determine, based on step S102, the wrinkle point shown by the white bright spot in the image shown by (b) in FIG. 10. Then, the electronic device 100 may determine at least one contour line based on the wrinkle point, a straight line segment included in the contour line may be used as the wrinkle line, to obtain a wrinkle line shown by white a bright line in an image shown by (c) in FIG. 10.

Figure 11:
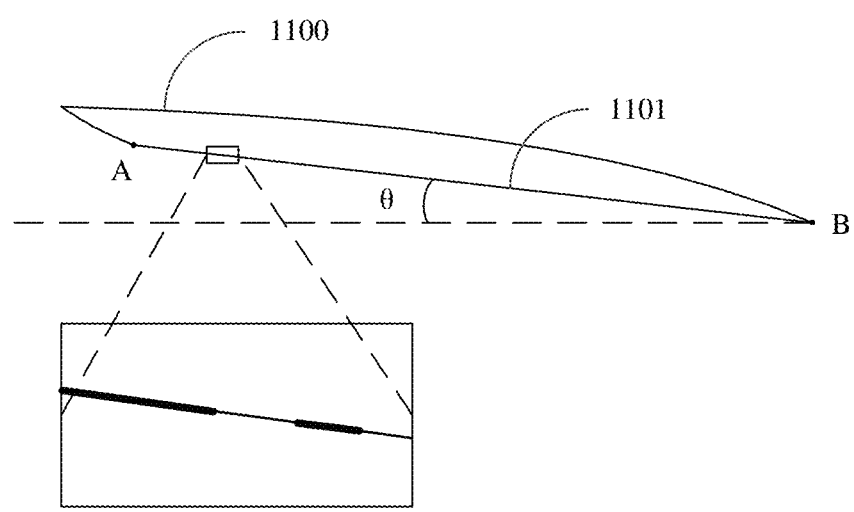
FIG. 11 is a schematic diagram of a wrinkle line according to an embodiment.

The wrinkle line determined by the processor 110 meets one or more of the following preset conditions:

According to a first exemplary condition, a size of the wrinkle line is not less than a preset pixel size. The size of the wrinkle line herein may be represented by a length of the wrinkle line, where the length of the wrinkle line may be a length of a straight line segment forming the wrinkle line (a length unit of the straight line segment is a quantity of pixel points); or the size of the wrinkle line may be represented by a quantity of pixel points of a straight line segment forming the wrinkle line. The processor 110 may select, according to the first condition, a straight line segment whose size is not less than the preset pixel size as the wrinkle line. As shown in FIG. 11, if the preset pixel size is 50 pixels (each pixel is a size of one pixel point), and when a quantity of pixels of the straight line segment 1101 between a pixel point A and a pixel point B on the contour line 1100 is greater than or equal to 50, the straight line segment 1101 may be used as the wrinkle line. It should be understood that, in this exemplary embodiment, a size of the wrinkle line is greater than a preset pixel size may alternatively be used as a preset condition.

According to a second exemplary condition, an included angle between a connection line of two farthest pixel points on the wrinkle line and a horizontal direction is not greater than a preset included angle. The processor 110 may use a straight line segment that meets the second condition as the wrinkle line. As shown in FIG. 11, if the preset angle is 15°, an included angle θ between the straight line segment 1101 from the pixel point A and the pixel point B and a horizontal direction is not greater than 15°, the straight line segment 1101 may be used as the wrinkle line. It should be understood that, in an exemplary embodiment, an included angle between a connection line of two farthest pixel points on the wrinkle line and a horizontal direction is less than a preset included angle is used as a preset condition.

In this implementation, the processor 110 may use the foregoing first condition or second condition as a preset condition, or may use the foregoing first condition and second condition as a preset condition.

After determining the straight line segment 1101 as the wrinkle line, the processor 110 may further determine and store information about the straight line segment 1101, to subsequently determine a wrinkle score. For example, a length, a width, and an area of the straight line segment 1101 and a contrast ratio value of a pixel point on the straight line segment 1101 may be determined and stored. The foregoing process of determining the information about the straight line segment 1101 may be implemented by the processor 110 by invoking the program code in the internal memory 121. After that, the processor 110 may store the determined information about the straight line segment 1101 in the internal memory 121, or store the information in the external memory by using the external memory interface 120.

The width of the straight line segment 1101 may be represented by a quantity of pixels, and may be used to represent an average pixel width of the straight line segment 1101. As shown in FIG. 10, the straight line segment 1101 may be a straight line segment with an uneven width, and the average pixel width of the straight line segment 1101 may be used as the width of the straight line segment 1101. For example, if a length of the straight line segment 1101 is 60 pixels, and a length of the straight line segment 1101 whose width is 1 (pixel) is 30 pixels, a length of the straight line segment 1101 whose width is 2 is 20 pixels, and a length of the straight line segment 1101 whose width is 3 is 10 pixels, it may be contemplated that an average pixel width of the straight line segment 1101 is 2 pixels (1×30+2×20+3×10)/60, so that 2 may be used as the width of the straight line segment 1101.

The area of the straight line segment 1101 may be represented by a quantity of pixel points of the straight line segment forming the wrinkle line, and a unit is a quantity of pixels.

The contrast ratio value of the pixel point on the straight line segment 1101 may be used to represent a contrast ratio of the pixel point on the straight line segment 1101. In implementation, an average value of the contrast ratios of the pixel points on the straight line segment 1101 may be used as a contrast ratio value of the pixel points on the straight line segment 1101.

The processor 110 may display the determined at least one wrinkle line in the region in which the wrinkle needs to be detected, to indicate a position of the wrinkle in the region in which the wrinkle needs to be detected. For example, if there are two or more than two to-be-detected images, wrinkle lines determined in all the to-be-detected images may be fused into the region in which the wrinkle needs to be detected for display. It should be understood that "fusion" herein means merging wrinkle lines in a plurality of images into the same image or means merging a wrinkle line in an image into another image. Before and after fusion, a position of the wrinkle line in the image remains unchanged.

In a feasible implementation, if a to-be-detected image is obtained after the region in which the wrinkle needs to be detected is rotated, before the wrinkle line is fused, the wrinkle line (namely, the wrinkle line determined based on the to-be-detected image) corresponding to the to-be-detected image further needs to be rotated in a reverse direction. For example, if a to-be-detected image is obtained by rotating, clockwise by 30°, the region in which the wrinkle needs to be detected, in a process of fusing the wrinkle line, the wrinkle line determined based on the to-be-detected image needs to be rotated counterclockwise by 30°, and then the wrinkle line is fused with a wrinkle line corresponding to another to-be-detected image (if the other to-be-detected image is rotated, the other to-be-detected image needs to be rotated in a reverse direction).

In another feasible implementation, if a candidate image is obtained after the region in which the wrinkle needs to be detected is rotated, and a to-be-detected image is obtained after the candidate image is scaled down, before the wrinkle line is fused, the wrinkle line corresponding to the to-be-detected image may further be scaled up, where a scaled-up proportion during scaling up is 1/preset proportion according to which the candidate image is scaled down (for example, if the preset proportion according to which the candidate image is scaled down is n, the candidate image is scaled up according to a proportion of 1/n). For example, if the candidate image is scaled down according to a preset proportion of 0.5 to obtain the to-be-detected image, before the wrinkle line is fused, the wrinkle line corresponding to the to-be-detected image may be scaled up by two times according to a proportion of 1/0.5, and then the wrinkle line is fused with a wrinkle line corresponding to another to-be-detected image (if the other to-be-detected image is scaled down, the other to-be-detected image needs to be scaled up proportionally).

For example, if the to-be-detected image determined in step S101 is the image shown by (a) in FIG. 7, the image shown by (b) in FIG. 7, and the image shown by (c) in FIG. 7, the image shown by (a) in FIG. 7 may be considered as an image obtained by scaling down a candidate image (the candidate image is an image shown by (a) in FIG. 7 according to a preset proportion of 1, the image shown by (b) in FIG. 7 is obtained by scaling down a candidate image according to a preset proportion of 0.5, and the image shown by (c) in FIG. 7 is obtained by scaling down a candidate image according to a preset proportion of 0.3. A wrinkle line that is obtained after the wrinkle line determined based on the image shown by (a) in FIG. 7 is multiplied by 1 is shown by a white bright line in an image shown by (a) in FIG. 12, an image that is obtained after the wrinkle line determined based on the image shown by (b) in FIG. 7 is multiplied by 1/0.5 is shown by a white bright line in an image shown by (b) in FIG. 12, and an image that is obtained after the wrinkle line determined based on the image shown by (c) in FIG. 7 is multiplied by 1/0.3 is shown by a white bright line in an image shown by (c) in FIG. 12. During fusion of the wrinkle line, the white bright line in the image shown by (a) in FIG. 12, the white bright line in the image shown by (b) in FIG. 12, and the white bright line in the image shown by (c) in FIG. 12 may be fused to obtain an image shown by (d) in FIG. 12, where the white bright line is used to represent a wrinkle line (the wrinkle line corresponding to the candidate image is a wrinkle line obtained by fusing determined wrinkle lines of all to-be-detected images determined based on the candidate image into the same image) corresponding to the candidate image shown by (a) in FIG. 7.

Figure 12:
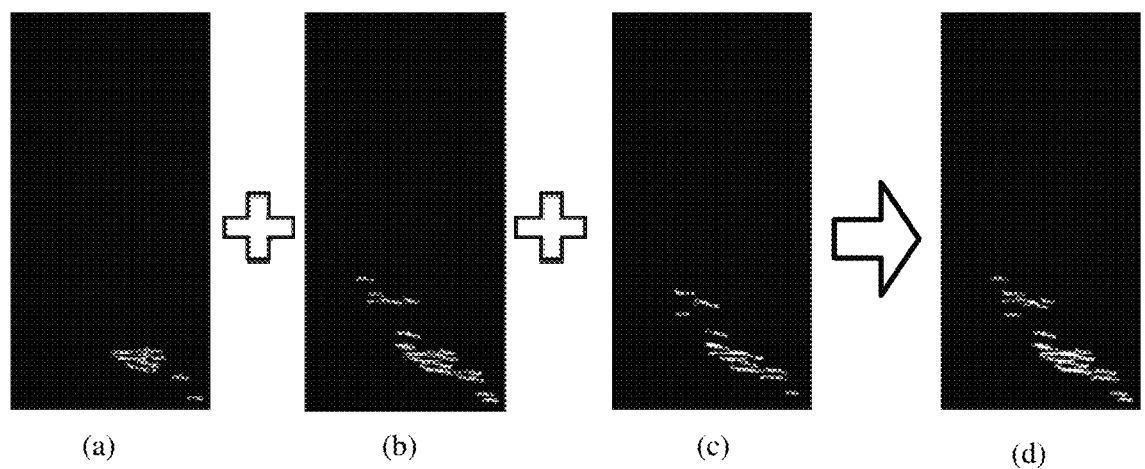
FIG. 12 is a schematic diagram of wrinkle line fusion according to an embodiment.
Figure 13:
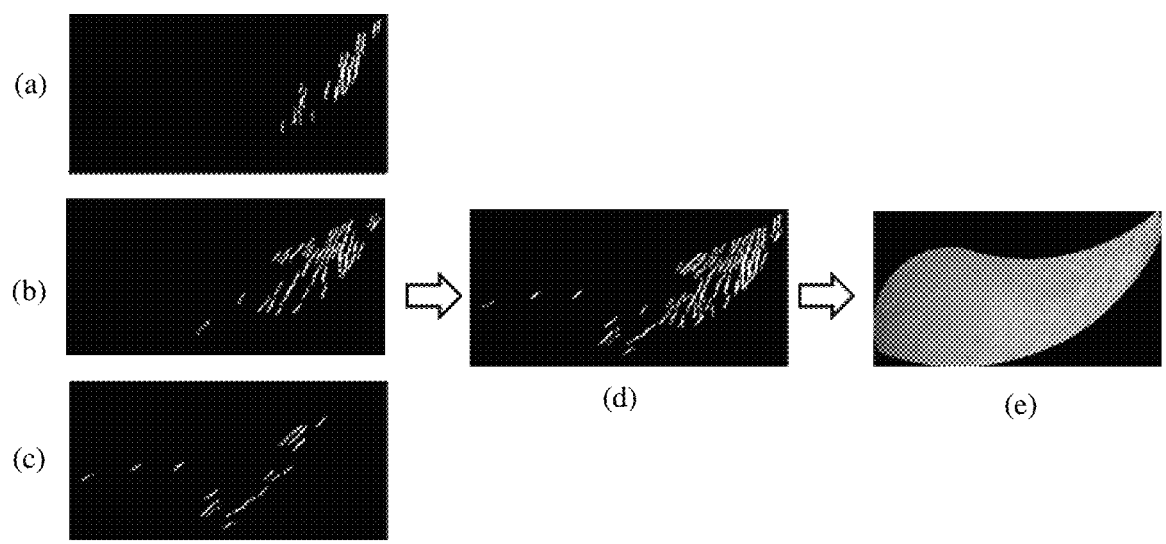
FIG. 13 is another schematic diagram of wrinkle line fusion according to an embodiment.

In the foregoing example, if the candidate image shown by (a) in FIG. 7 is obtained by rotating the area in which the wrinkle needs to be detected and that is shown in the image shown by (a) in FIG. 5 clockwise by 90°, the wrinkle line shown by the white bright line in the image shown by (d) in FIG. 12 may be rotated counterclockwise by 90°. Then, fusion is performed with a wrinkle line corresponding to another candidate image, to obtain a wrinkle line corresponding to the region in which the wrinkle needs to be detected (the wrinkle line corresponding to the region in which the wrinkle needs to be detected is a wrinkle line obtained by fusing all wrinkle lines corresponding to all to-be-detected images determined based on the region in which the wrinkle needs to be detected into the same image) and that is shown in the image shown by (a) in FIG. 5. For example, after a white bright line shown in an image shown by (d) in FIG. 12 is rotated counterclockwise by 90°, a white bright line in an image shown by (a) in FIG. 13 is obtained. A white bright line in an image shown by (b) in FIG. 13 may represent a wrinkle line corresponding to the candidate image shown by (b) in FIG. 6 after counterclockwise rotation of 60°. A white bright line in an image shown by (c) in FIG. 13 may represent a wrinkle line corresponding to the candidate image shown by (c) in FIG. 6 after counterclockwise rotation of 30°. In step S104, the white bright line in the image shown by (a) in FIG. 13, the white bright line in the image shown by (b) in FIG. 13, and the white bright line in the image shown by (c) in FIG. 13 may be fused to obtain a white bright line in an image shown by (d) in FIG. 13. Then, the white bright line in the image shown by (d) in FIG. 13 is displayed in the region in which the wrinkle needs to be detected in the image shown by (a) in FIG. 5, to obtain an image shown by (e) in FIG. 13. The white bright line in the image shown by (e) in FIG. 13 is a wrinkle line corresponding to the region in which the wrinkle needs to be detected, and it is used to indicate the wrinkle in the region in which the wrinkle needs to be detected.

In the embodiments, a wrinkle score in the face image of the user may further be determined based on the wrinkle in the region in which the wrinkle needs to be detected, where the wrinkle score is used to indicate a severity level of the wrinkle on a face of a user. For example, the wrinkle score may be determined based on a feature set of the displayed wrinkle line, the feature set of the wrinkle line includes one or more of the following features: a length of the wrinkle line, a width of the wrinkle line, a contrast ratio value of a pixel point on the wrinkle line, and an area proportion of the wrinkle line. The length of the wrinkle line may be a length of a straight line segment forming the wrinkle line. The width of the wrinkle line may be a width of a straight line segment forming the wrinkle line. The contrast ratio value of the pixel point on the wrinkle line is used to represent a contrast ratio of the pixel point on the wrinkle line, and may be represented by a contrast ratio value of a pixel point on a straight line segment forming the wrinkle line. The area proportion of the wrinkle line is used to represent a proportion of a quantity of pixels in a pixel area enclosed by the wrinkle line to a quantity of all pixels in the to-be-detected image, and the area proportion of the wrinkle line may be represented by an area of a straight line segment forming the wrinkle line. The foregoing process of determining the wrinkle score information may be implemented by the processor 110 by invoking the program code in the internal memory 121. When outputting the wrinkle score, the processor 110 may display the wrinkle score by using the display screen 194. For example, the wrinkle score may be displayed in the user interface 200 shown in FIG. 2A (as shown by "fine line 78 points" in FIG. 2A). Alternatively, the processor 110 may play, by using the speaker 170A or the headset interface 170D, audio corresponding to the wrinkle score.

For example, the wrinkle score may be determined to meet a requirement of the following formula:

$$H = A \times \omega 1 + B \times \omega 2 + C \times \omega 3 + D \times \omega 4 + \omega 5 \quad (6)$$

H is the wrinkle score, A is the length of the wrinkle line, B is the width of the wrinkle line, C is the contrast ratio value of the pixel point on the wrinkle line, D is the area proportion of the wrinkle line, $\omega 1$, $\omega 2$, $\omega 3$, and $\omega 4$ are preset parameters less than 0, and $\omega 5$ is a preset parameter. In implementation, $\omega 5$ may be a preset positive integer. For example, a value of $\omega 5$ may be related to a full score of the wrinkle score. For example, if the full score of the wrinkle score is 100, a value of $\omega 5$ may be 100. In implementation, H obtained after rounding in formula (6) may further be used as the wrinkle score of the user.

In a feasible manner, lengths of all wrinkle lines in the region in which the wrinkle needs to be detected may be ranked, and the first N (N≥2) long wrinkle lines are determined as target wrinkle lines. An average length of the N target wrinkle lines is used as a length of the wrinkle lines in the feature set, and an average width of the N target wrinkle lines is used as a width of the wrinkle lines in the feature set, an average value of contrast ratio values of pixel points on the N target wrinkle lines is used as a contrast ratio value of pixel points on the wrinkle lines in the feature set, and an average value of area proportions of the N target wrinkle lines is used as an area proportion of the wrinkle lines in the feature set.

Figure 14:
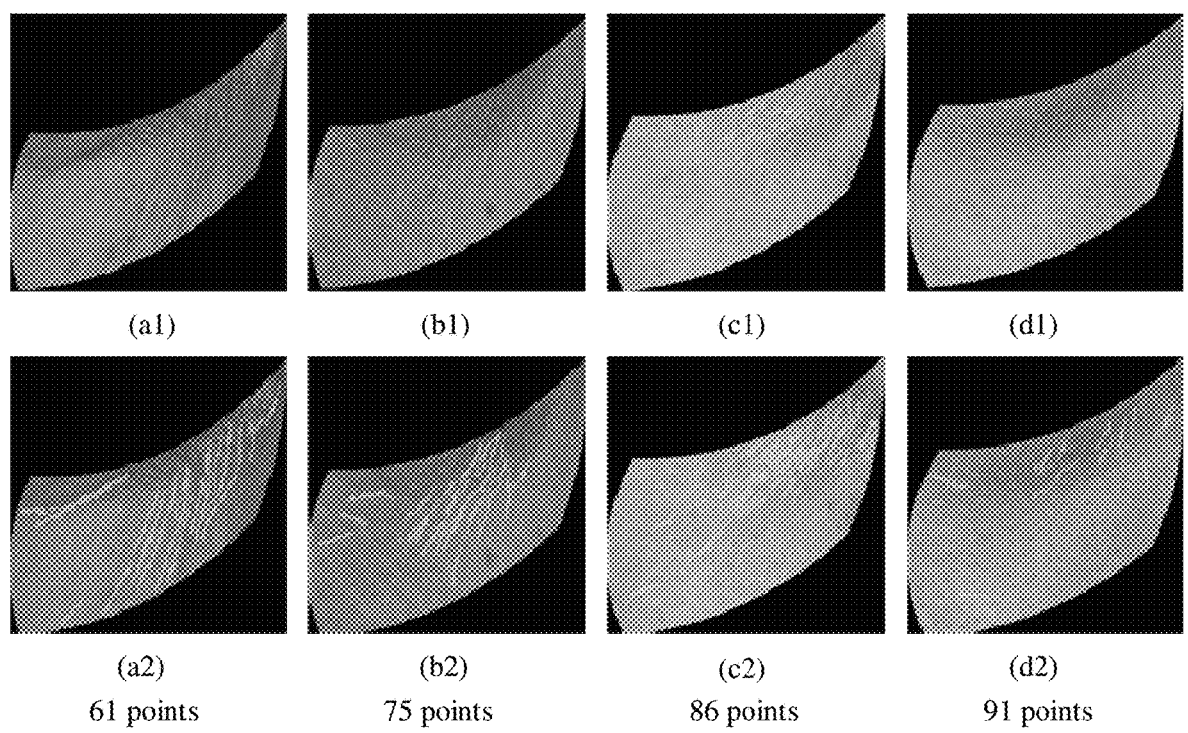
FIG. 14 is a schematic diagram of a wrinkle in an eye below region and a corresponding wrinkle score according to an embodiment.

For example, for a result of performing wrinkle scoring on an eye below region of the user by using the foregoing method, refer to FIG. 14. A wrinkle line determined based on an eye below region by (a1) in FIG. 14 is shown by a white bright line in an image shown by (a2) in FIG. 14, and a wrinkle score corresponding to the eye below region by (a1) in FIG. 14 determined by using the foregoing method is 61 points. A wrinkle line determined based on an eye below region by (b1) in FIG. 14 is shown by a white bright line in an image shown by (b2) in FIG. 14, and a wrinkle score corresponding to the eye below region by (b1) in FIG. 14 determined by using the foregoing method is 75 points. A wrinkle line determined based on an eye below region by (c1) in FIG. 14 is shown by a white bright line in an image shown by (c2) in FIG. 14, and a wrinkle score corresponding to the eye below region by (c1) in FIG. 14 determined by using the foregoing method is 86 points. A wrinkle line determined based on an eye below region by (d1) in FIG. 14 is shown by a white bright line in an image shown by (d2) in FIG. 14, and a wrinkle score corresponding to the eye below region by (d1) in FIG. 14 determined by using the foregoing method is 91 points.

Figure 15:
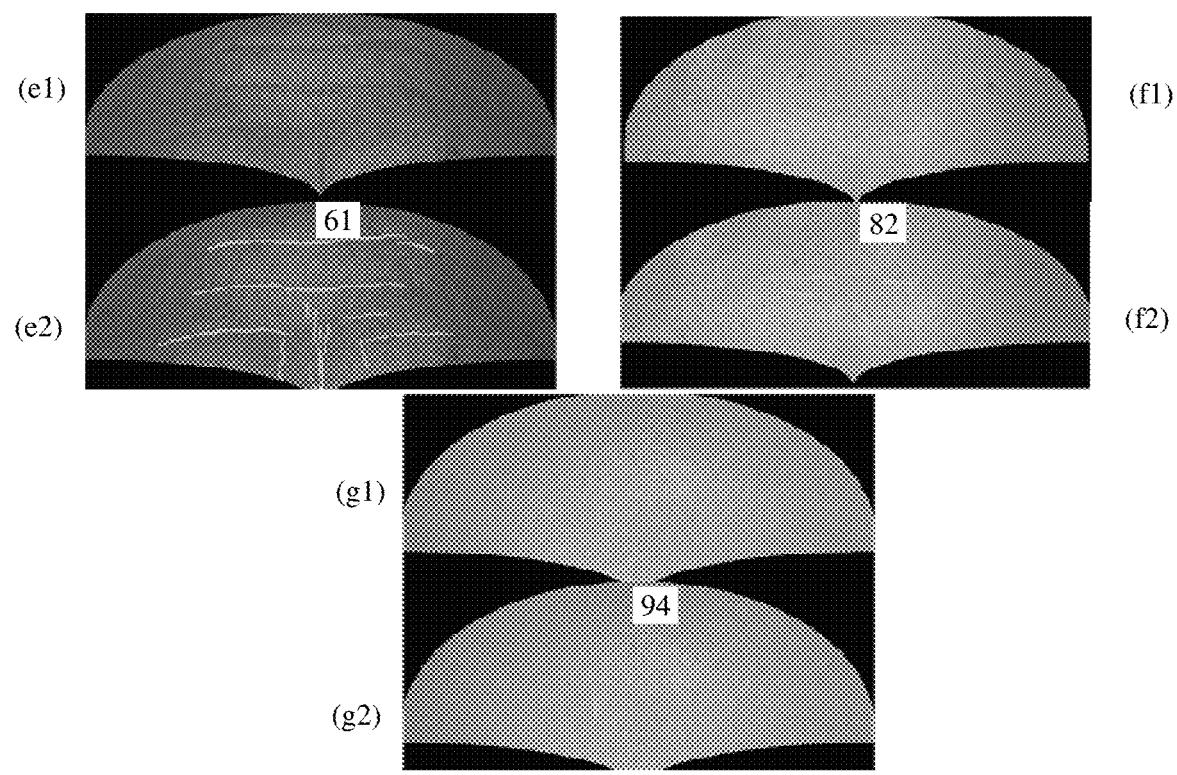
FIG. 15 is a schematic diagram of a wrinkle in a forehead region and a corresponding wrinkle score according to an embodiment.

By using the foregoing method, for a result of performing wrinkle scoring on a forehead region of the user, refer to FIG. 15. A wrinkle line determined based on a forehead region by (e1) in FIG. 15 is shown by a white bright line in an image shown by (e2) in FIG. 15, and a wrinkle score corresponding to the forehead region by (e1) in FIG. 15 determined by using the foregoing method is 61 points. A wrinkle line determined based on a forehead region by (f1) in FIG. 15 is shown by a white bright line in an image shown by (f2) in FIG. 15, and a wrinkle score corresponding to the forehead region by (f1) in FIG. 15 determined by using the foregoing method is 82 points. A wrinkle line determined based on a forehead region by (g1) in FIG. 15 is shown by a white bright line in an image shown by (g2) in FIG. 15, and a wrinkle score corresponding to the forehead region by (g1) in FIG. 15 determined by using the foregoing method is 94 points.

In a possible implementation, an average value of wrinkle scores of all regions in which wrinkles need to be detected may be rounded (for example, rounded up), and a rounded value is used as a total score of wrinkle scoring of the user. For example, a score of the forehead region of the user is 94 points, a score of the eye below region of the user is 91 points, and 93 points may be used as a total score of the wrinkle scoring of the user.

Figure 16:
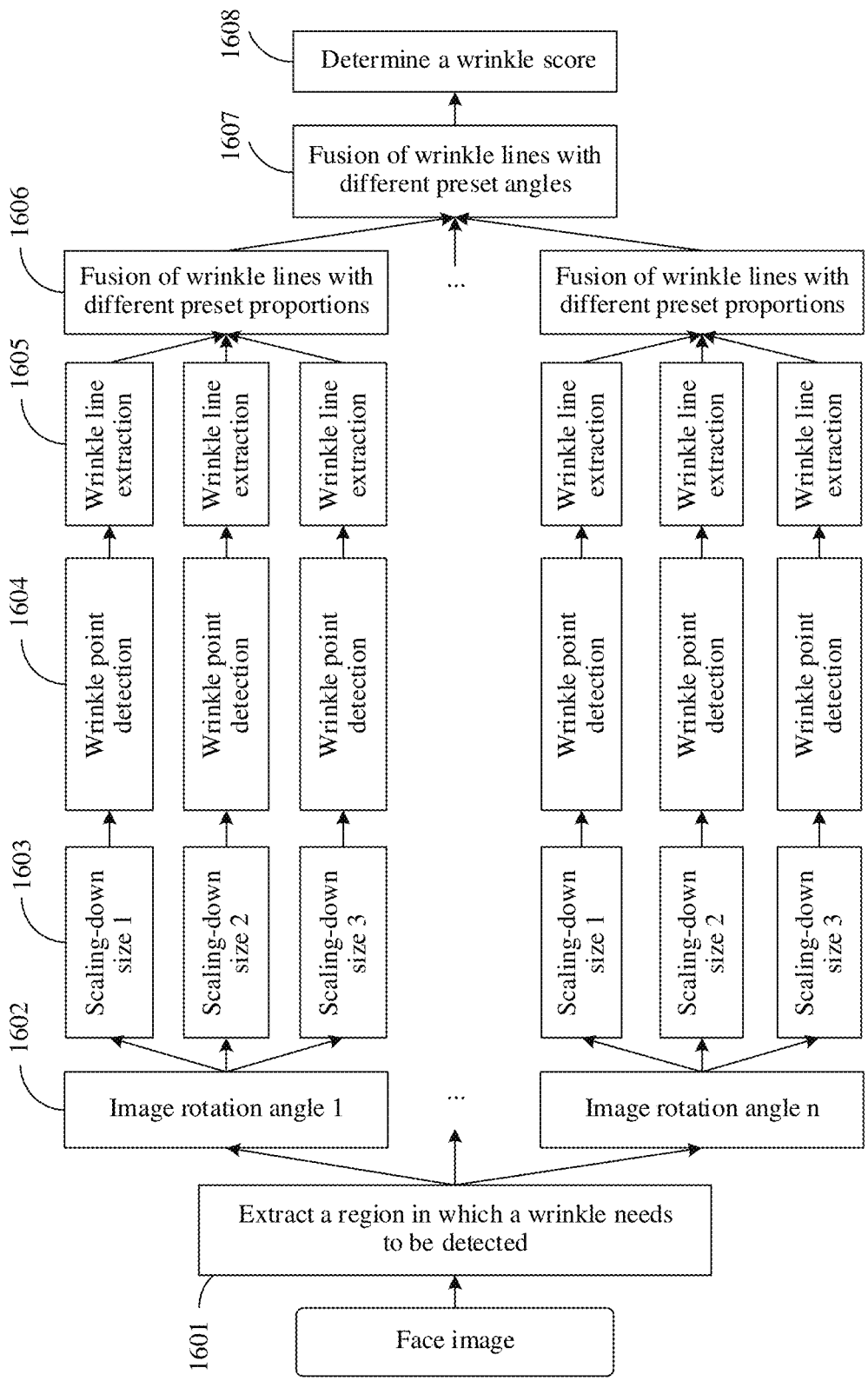
FIG. 16 is a schematic flowchart of another wrinkle detection method according to an embodiment.

With reference to FIG. 16, an exemplary implementation process of wrinkle scoring is described in detail, and the following steps may be included:

In step 1601, the processor 110 extracts, based on a face image, a region, in the face image, in which a wrinkle needs to be detected.

In step 1602, the processor 110 respectively rotates, according to a plurality of preset angles in a preset angle set, the region obtained in step 1601, to obtain a plurality of candidate images.

In step 1603, the processor 110 rotates each candidate image according to a plurality of preset proportions in a preset proportion set, to obtain a plurality of to-be-detected images.

In step 1604, the processor 110 determines wrinkle points for each of the to-be-detected images based on grayscale values of pixel points in each of the to-be-detected images.

In step 1605, the processor 110 determines at least one wrinkle line for each of the to-be-detected images based on the determined wrinkle points.

In step 1606, for a plurality of to-be-detected images obtained according to the same candidate image, the processor 110 scales up the obtained wrinkle line according to a preset proportion and fuses the scaled-up wrinkle line into the candidate image, to obtain a fused wrinkle line corresponding to the candidate image.

In step 1607, for a fused wrinkle line corresponding to each candidate image, the processor 110 performs reverse rotation according to a preset angle based on which the candidate image is obtained, fuses the rotated wrinkle line into the region in which the wrinkle needs to be detected, to obtain a wrinkle line corresponding to the region in which the wrinkle needs to be detected, and further display the wrinkle line corresponding to the region in which the wrinkle needs to be detected on the display screen 194.

In step 1608, the processor 110 determines a wrinkle score based on the wrinkle line corresponding to the region in which the wrinkle needs to be detected, and displays, on the display screen 194, the wrinkle score corresponding to the region in which the wrinkle needs to be detected.

Figure 2A:
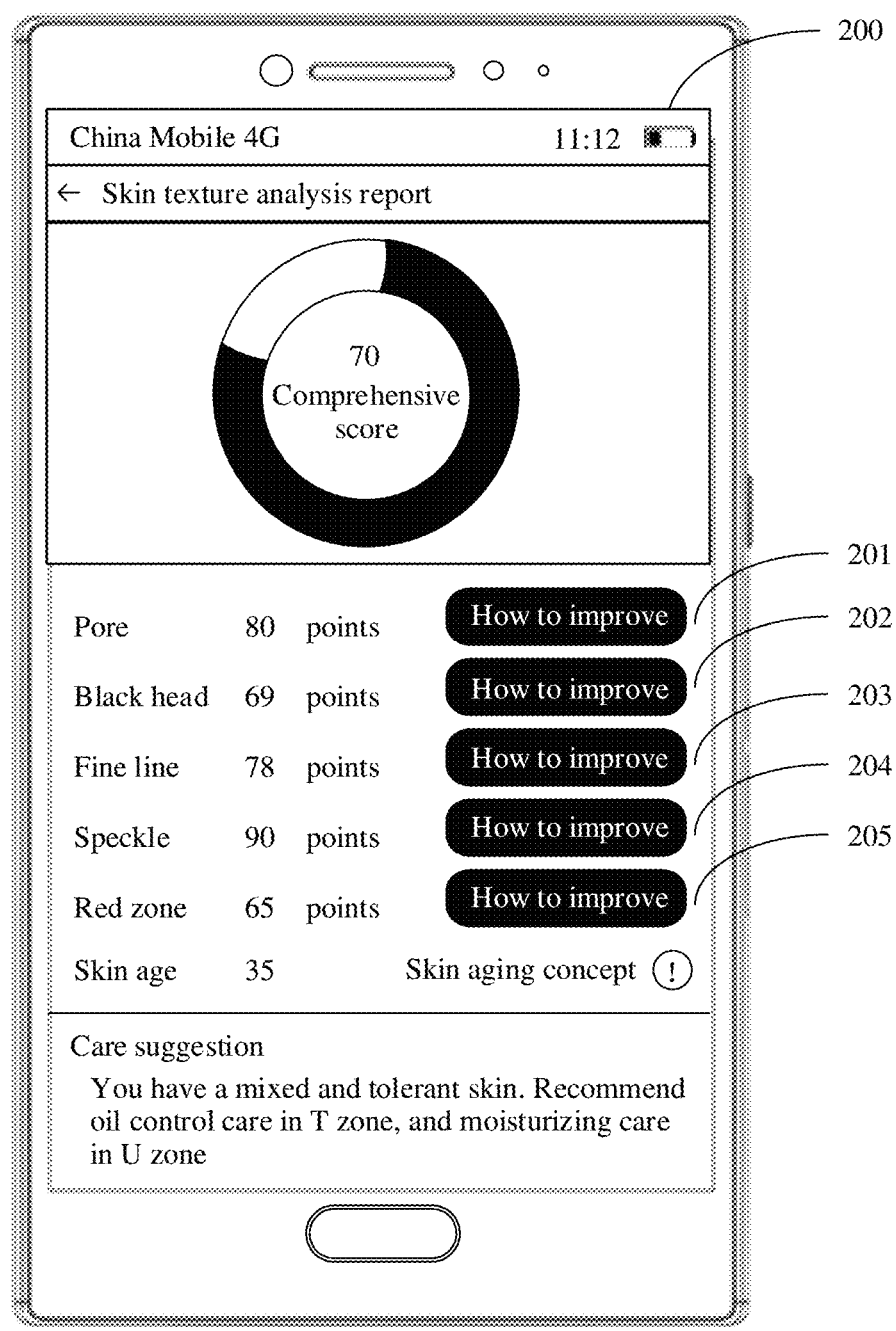
FIG. 2A is a schematic diagram of a user interface to which an embodiment is applicable.
Figures 1, 2B:
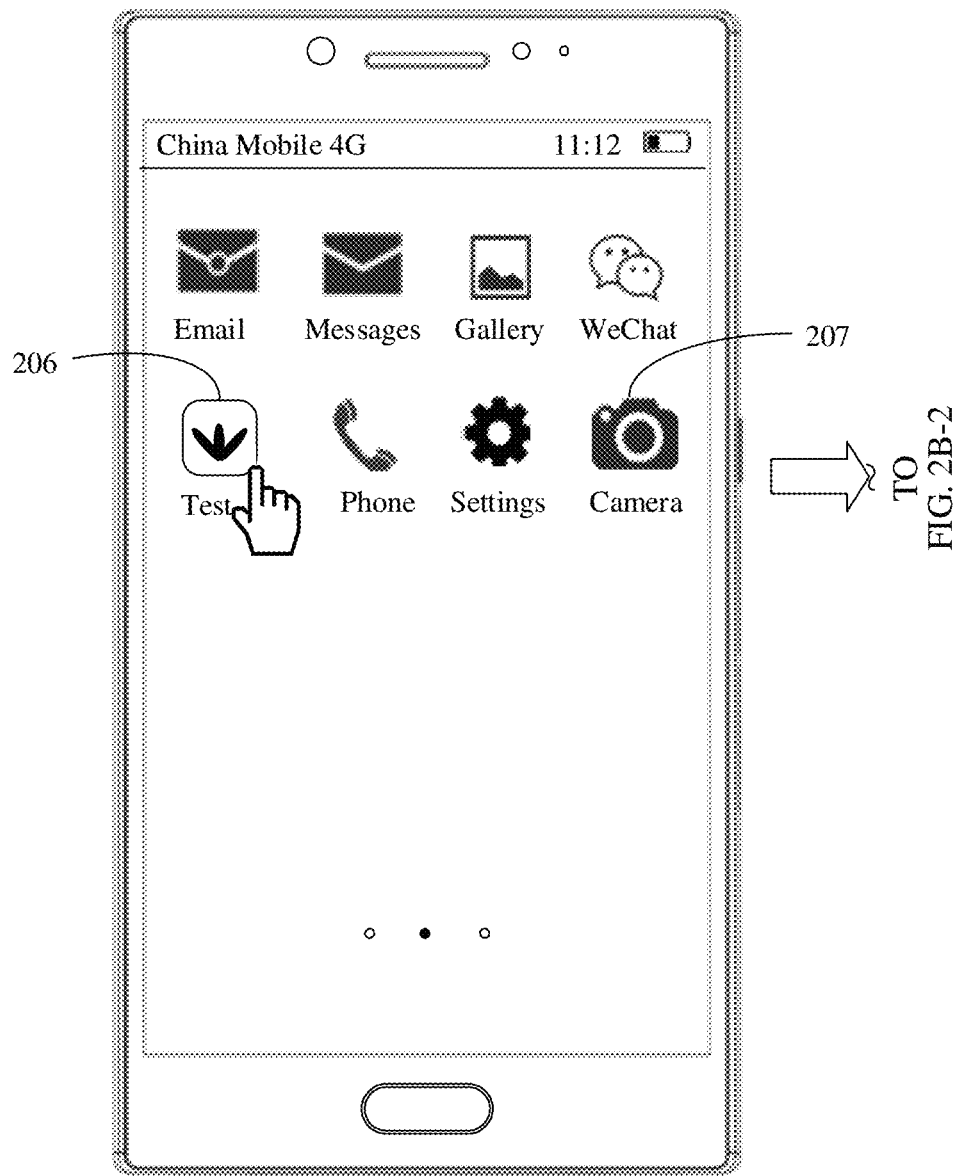
Figures 2, 2B:
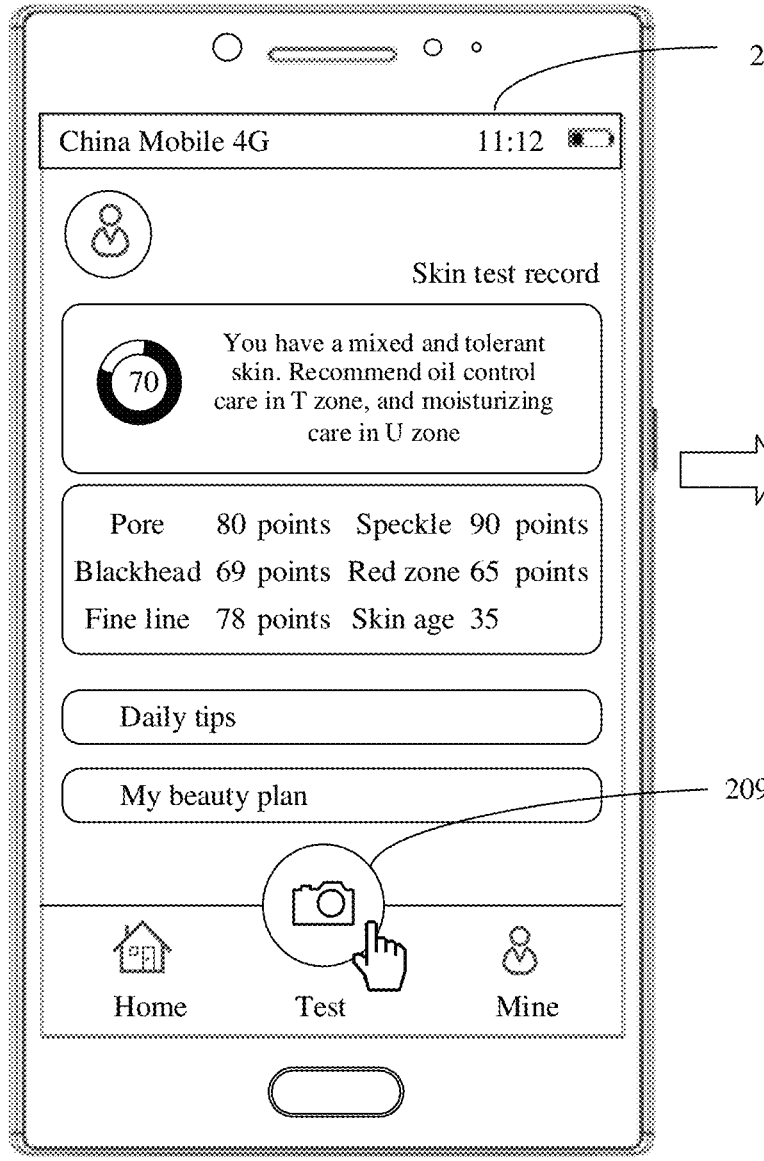
Figures 2, 2B, 3:
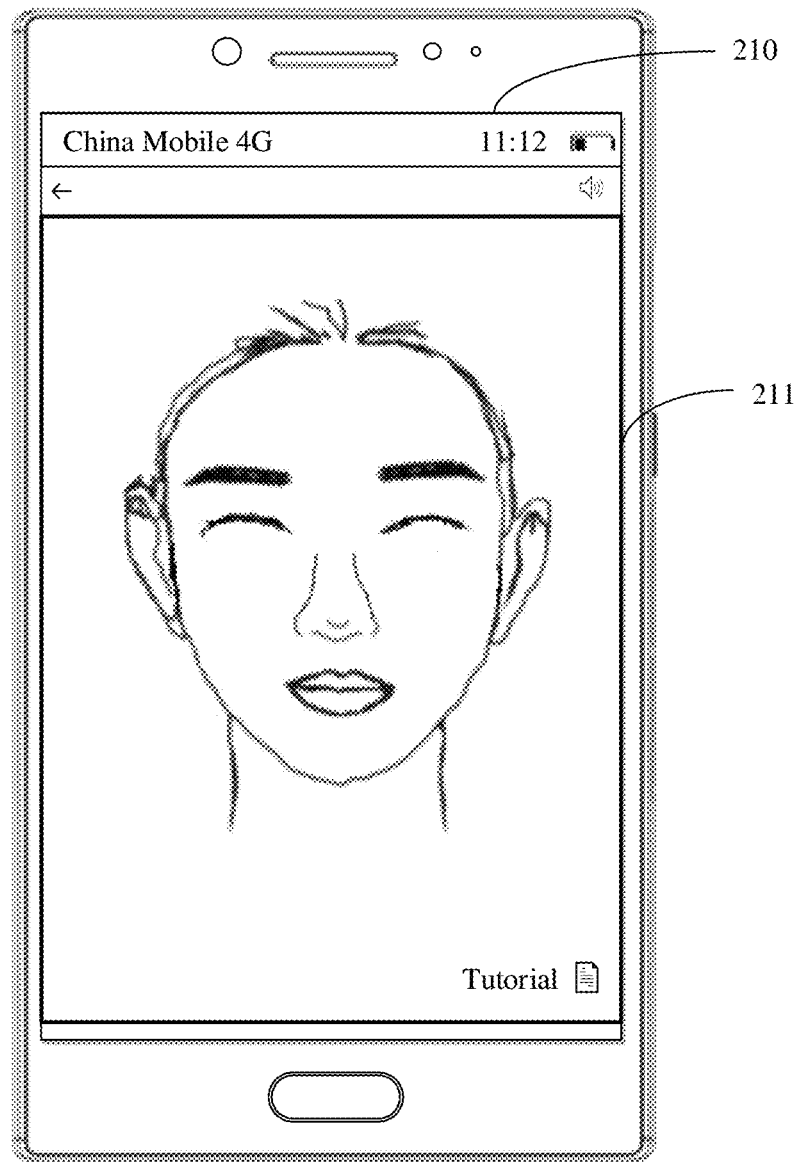
Figures 2, 2B, 3, 4:
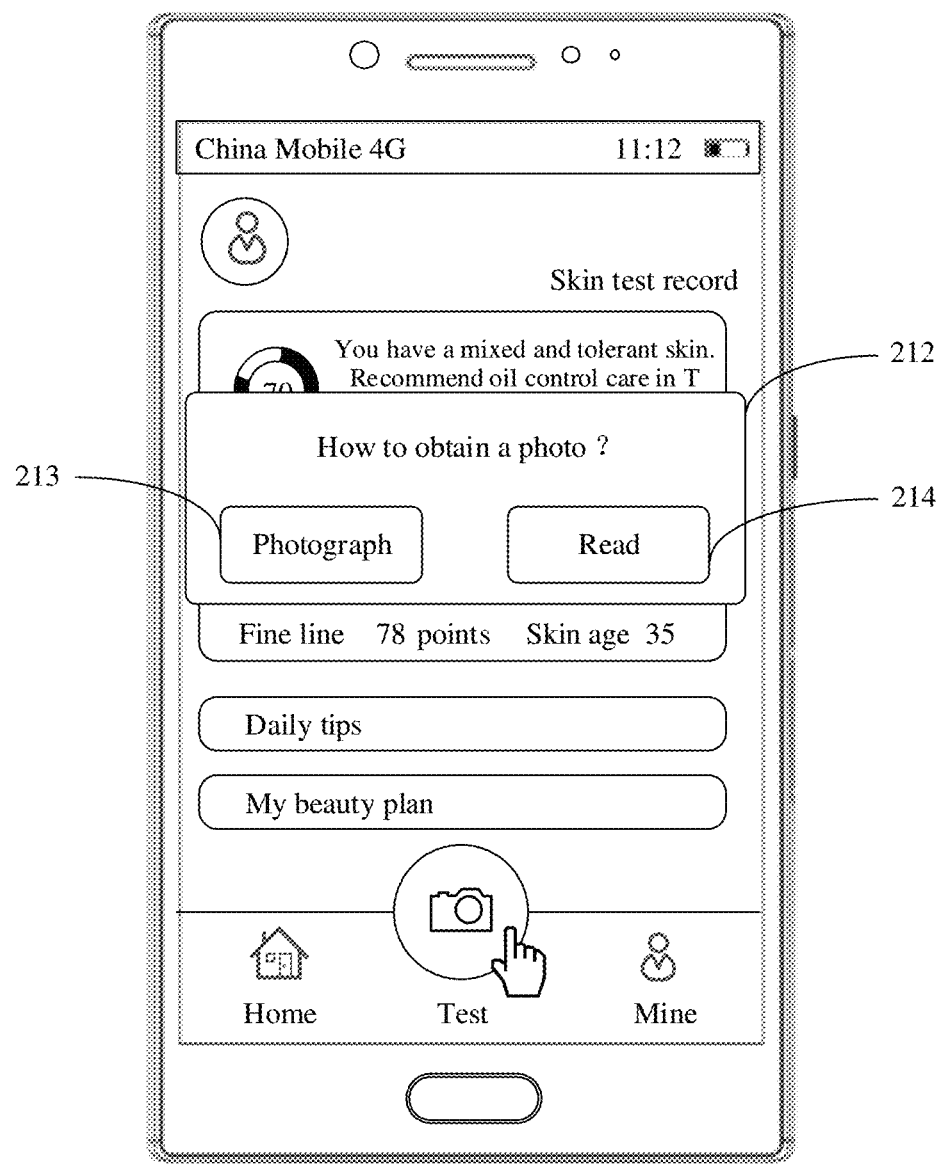
Figure 3:
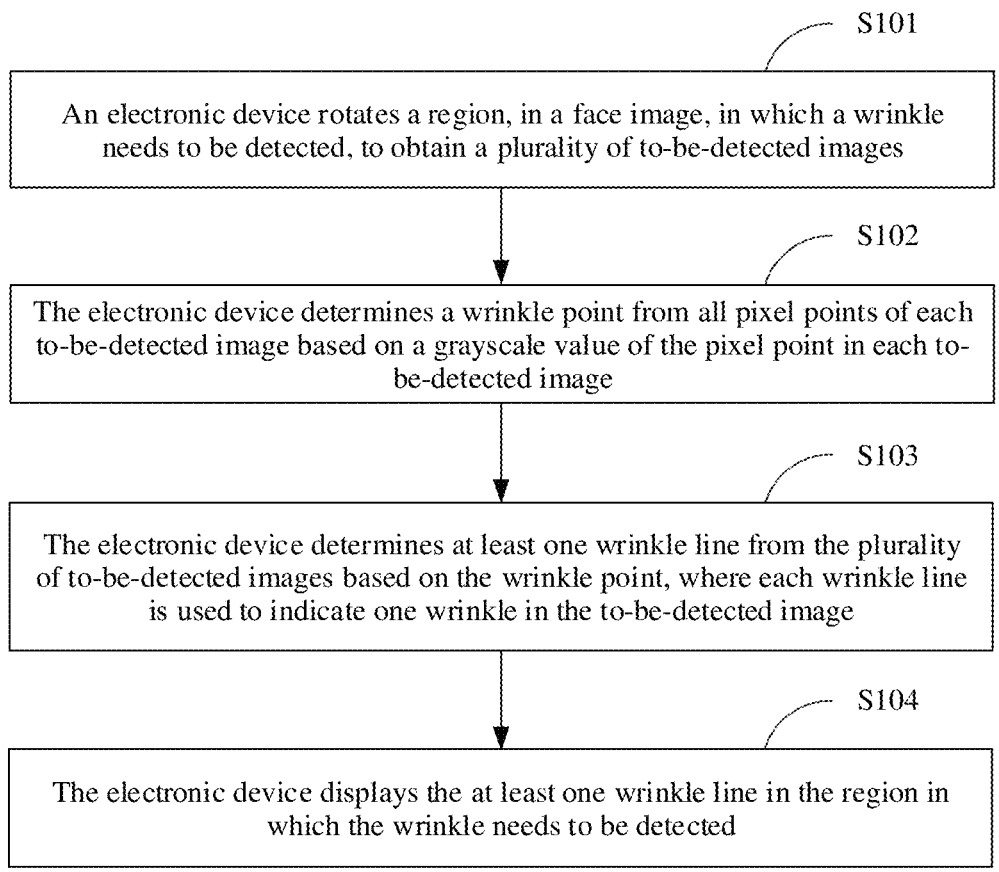
Figure 4:
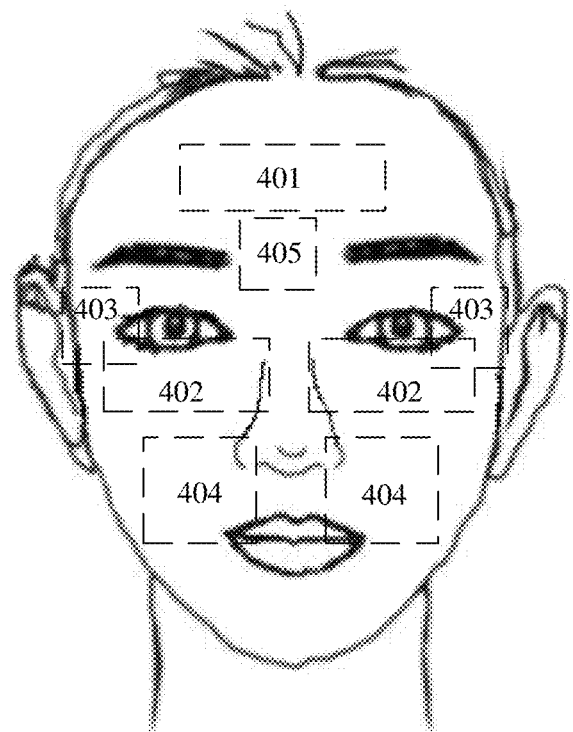

In the implementation of step 1608, the processor 110 may display, by using the display screen 194, the wrinkle score on the user interface shown in FIG. 2A, as shown by "fine line 78 points" in the figure. The processor 110 may also display a wrinkle detection result report by using the display screen 194. The wrinkle detection result report may include but is not limited to a wrinkle score, a skin care suggestion, a result graph, and the like. As shown in FIG. 17, the display screen 194 may display a wrinkle detection result report page 1700. It may be contemplated that the wrinkle detection result report page 1700 may include a wrinkle score, a skin care suggestion, and a region that is marked with a wrinkle line and in which a wrinkle needs to be detected, namely, a result graph of wrinkle detection. For example, the wrinkle detection result report page 1700 may be displayed after the processor 110 determines the wrinkle score or may be displayed after the processor 110 detects an operation on the virtual key 203 shown in FIG. 2A.

After the wrinkle detection method provided in this embodiment is used to perform the wrinkle detection on the region in which the wrinkle needs to be detected, the detected wrinkle line may be marked in the region in which the wrinkle needs to be detected, and the region that is marked with the wrinkle line and in which the wrinkle needs to be detected may be displayed on the display screen 194 of the electronic device 100. For example, the region that is marked with the wrinkle line and in which the wrinkle needs to be detected may be displayed on the user interface 200 shown in FIG. 2. Therefore, a wrinkle position can be intuitively indicated.

It should be understood that in the embodiments provided herein, the methods provided in the embodiments are described from a perspective in which the electronic device is used as an execution body. To implement functions in the methods provided in the embodiments, the electronic device may include a hardware structure and/or a software module, and implement the functions in a form of the hardware structure, the software module, or a combination of the hardware structure and the software module. Whether a function in the foregoing functions is performed in a manner of the hardware structure, the software module, or the combination of the hardware structure and the software module depends on particular applications and design constraint of the technical solution.

Figure 18:
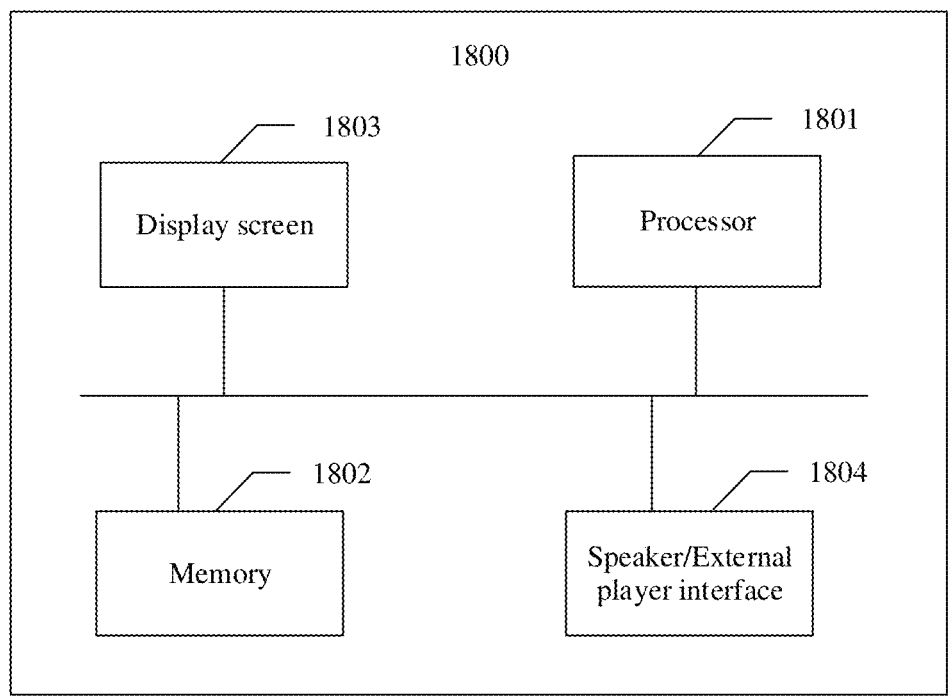
FIG. 18 is a schematic structural diagram of another electronic device according to an embodiment.

Based on the same concept, FIG. 18 shows an electronic device 1800 according to an exemplary embodiment. For example, the electronic device 1800 includes at least one processor 1801, a memory 1802, and a display screen 1803. The processor 1801 is coupled to the memory 1802 and the display screen 1803. Couplings in the embodiments are indirect couplings or communication connections between apparatuses, units, or modules, and may be implemented in electronic, mechanical, or other forms, and are used for information exchange between the apparatuses, the units, or the modules.

In implementation, the memory 1802 may be configured to store a program instruction, and the display screen 1803 may be configured to implement a display function of the electronic device 1800. The processor 1801 may be configured to: when invoking a program or an instruction stored in the memory 1802, and in combination with the display screen 1803, enable the electronic device 1800 to perform the steps performed by the electronic device in the wrinkle detection method shown in FIG. 3 and/or FIG. 16, to improve photographing quality.

In an exemplary embodiment, the memory 1802 may have a function of the internal memory 121 of the electronic device 100 in the foregoing method embodiment. For example, the memory 1802 stores program code and an instruction, and stores information about the straight line segment 1101 determined by the electronic device 100. The processor 1801 may have a function of the processor 110 of the electronic device 100 in the foregoing method embodiment. For example, the processor 1801 may invoke a program stored in the memory 1802, to perform steps S101, S102, and S103 in the method shown in FIG. 3, or perform steps 1601 to 1608 in the method shown in FIG. 16. The display screen 1803 may have a function of the display screen 194 of the electronic device 100 in the foregoing method embodiment. For example, the display screen 1803 may be configured to perform step S104 in the method shown in FIG. 3, and is configured to display the wrinkle line that is determined in step 1607 and that are corresponding to the region in which the wrinkle needs to be detected, and may be configured to display the wrinkle score.

For example, the electronic device 1800 may further include a speaker/external player interface 1804, and the speaker/external player interface 1804 may have a function of the speaker 170A/headset jack 170D of the electronic device 100. For example, the speaker/external player interface 1804 may be configured to output the wrinkle score.

A person of ordinary skill in the art may clearly know that the embodiments may be implemented through hardware, firmware, or a combination thereof. When the embodiments are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. This is used as an example but is not limited to: The computer-readable medium may include a RAM, a ROM, an electrically erasable programmable read-only memory (EEPROM), a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk or disc used by the embodiments includes a compact disc (CD), a laser disc, an optical disc, a digital video disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above are merely embodiments, but are not intended to limit the protection scope. Any modification, equivalent replacement, or improvement made according to the disclosure shall fall within the protection scope.

The invention claimed is:

1. A wrinkle detection method, comprising:
   rotating, according to some or all preset angles in a preset angle set, a region of a face image, in which a wrinkle will be detected, to obtain a plurality of to-be-detected images, wherein the preset angle set comprises a plurality of preset angles, and values of the preset angles are different;
   determining wrinkle points from all pixel points of each to-be-detected image of the plurality of to-be-detected images based on grayscale values of the pixel points in each to-be-detected image of the plurality of to-be-detected images;
   determining at least one wrinkle line from the plurality of to-be-detected images based on the wrinkle points, wherein each of the at least one wrinkle line indicates one wrinkle in each to-be-detected image of the plurality of to-be-detected images;
   performing, for the at least one wrinkle line corresponding to each to-be-detected image, reverse rotation according to a preset angle based on which the to-be-detected image is obtained, to obtain rotated wrinkle lines;
   fusing the rotated wrinkle lines into the region in which the wrinkle will be detected, to obtain a wrinkle line corresponding to the region in which the wrinkle will be detected;
   displaying the wrinkle line in the region;
   determining a wrinkle score corresponding to the region in which the wrinkle will be detected based on a feature set of the displayed wrinkle line, wherein the feature set comprises the following features: a length of the wrinkle line, a width of the wrinkle line, and a contrast ratio value of a pixel point on the wrinkle line, and an area proportion of the wrinkle line, wherein the contrast ratio value represents a contrast ratio of the pixel point on the wrinkle line, and the area proportion of the wrinkle line represents a proportion of a quantity of pixels on the wrinkle line to a quantity of all pixels in the to-be-detected image; and
   outputting the wrinkle score, wherein the wrinkle score is determined according to the following formula:

$H = A \times \omega1 + B \times \omega2 + C \times \omega3 + D \times \omega4 + \omega5$, wherein H is the wrinkle score, A is the length of the wrinkle line, B is the width of the wrinkle line, C is the contrast ratio value of the pixel point on the wrinkle line, D is the area proportion of the wrinkle line, $\omega1$, $\omega2$, $\omega3$, and $\omega4$ are preset parameters less than o, and $\omega5$ is a preset parameter.

2. The method of claim 1, wherein determining the wrinkle points from all the pixel points of each to-be-detected image of the plurality of to-be-detected images based on the grayscale values of the pixel points in each to-be-detected image of the plurality of to-be-detected images comprises:
   setting a rectangular window;
   controlling, according to a specified sliding step, the rectangular window to traverse each to-be-detected image of the plurality of to-be-detected images;
   determining, at each window position in which the rectangular window is located, a central pixel point located at a central position of the rectangular window, and determining a confidence value of the central pixel point based on grayscale values of all pixel points in the rectangular window, to obtain a plurality of confidence values, wherein each confidence value indicates a possibility that the central pixel point is the wrinkle point; and
   using a central pixel point corresponding to a confidence value not less than a threshold as the wrinkle point.

3. The method of claim 2, wherein both a length and a width of the rectangular window are N pixels; and determining the central pixel point located at the central position of the rectangular window, and determining the confidence value of the central pixel point based on the grayscale values of all pixel points in the rectangular window comprises:
   determining the confidence value of the central pixel point located at the central position of the rectangular window according to the following formula:

$$M = \sum_{i,j=1}^{N} P_{ij} * Q_{ij},$$

wherein
   M represents the confidence value of the central pixel point at the central position of the rectangular window, $P_{ij}$ represents an element located in row i and column j in a first matrix, and $Q_{ij}$ represents an element located in row i and column j in a second matrix, wherein the first matrix is a preset N×N matrix, elements in each row in the first matrix are the same, and the element in row i and column j in the second matrix is a grayscale value of a pixel point in row i and column j in the rectangular window, wherein $1 \leq i \leq N$, $1 \leq j \leq N$, N is an odd number, and N is greater than or equal to 3.

4. The method of claim 3, wherein an expression of the first matrix is:

$$P = \begin{bmatrix} n_1 & n_1 & n_1 \\ n_0 & n_0 & n_0 \\ n_1 & n_1 & n_1 \end{bmatrix},$$

wherein
   P is the first matrix, and $n_o > n_1$; or $$P = \begin{bmatrix} n_1 & n_1 & n_1 \\ n_0 & n_0 & n_0 \\ n_1 & n_1 & n_1 \end{bmatrix},$$

wherein

P is the first matrix, and $n_o < n_1$; or $$P = \begin{bmatrix} n_x & n_x & n_x & \ldots & n_x \\ n_{x-1} & n_{x-1} & n_{x-1} & \ldots & n_{x-1} \\ \ldots & \ldots & \ldots & \ldots & \ldots \\ n_0 & n_0 & n_0 & \ldots & n_0 \\ \ldots & \ldots & \ldots & \ldots & \ldots \\ n_{x-1} & n_{x-1} & n_{x-1} & \ldots & n_{x-1} \\ n_x & n_x & n_x & \ldots & n_x \end{bmatrix},$$

wherein

P is the first matrix, $n_u > n_{u-1}$, u is an integer and $1 \le u \le x$, $$x = \frac{N-1}{2},$$

and N is greater than 3; or $$P = \begin{bmatrix} n_x & n_x & n_x & \ldots & n_x \\ n_{x-1} & n_{x-1} & n_{x-1} & \ldots & n_{x-1} \\ \ldots & \ldots & \ldots & \ldots & \ldots \\ n_0 & n_0 & n_0 & \ldots & n_0 \\ \ldots & \ldots & \ldots & \ldots & \ldots \\ n_{x-1} & n_{x-1} & n_{x-1} & \ldots & n_{x-1} \\ n_x & n_x & n_x & \ldots & n_x \end{bmatrix},$$

wherein

P is the first matrix, $n_u < n_{u-1}$, u is an integer and $1 \le u \le x$, $$x = \frac{N-1}{2},$$

and N is greater than 3.

5. The method of claim 2, wherein the threshold is an average value of the plurality of confidence values.

6. The method of claim 1, wherein determining the at least one wrinkle line from the plurality of to-be-detected images based on the wrinkle points comprises:
determining a contour line of at least two consecutive wrinkle points in the wrinkle points;
determining straight line segments in the contour line; and
using some or all of the straight line segments as the wrinkle line.

7. The method of claim 1, wherein the wrinkle line meets one or more of the following conditions:
a size of the wrinkle line is not less than a preset pixel size; and
an included angle between a connection line of two farthest pixel points on the wrinkle line and a horizontal direction is not greater than a preset included angle.

8. The method of claim 1, wherein displaying the at least one wrinkle line in the region comprises:
displaying, in the region, all wrinkle lines determined based on all the to-be-detected images.

9. An electronic device, comprising:
a non-transitory memory comprising instructions; and
a processor coupled to the non-transitory memory, the instructions being executed by the processor to cause the electronic device to:
rotate, according to some or all preset angles in a preset angle set, a region of a face image, in which a wrinkle will be detected, to obtain a plurality of to-be-detected images, wherein the preset angle set comprises a plurality of preset angles, and values of the preset angles are different;
determine wrinkle points from all pixel points of each to-be-detected image of the plurality of to-be-detected images based on grayscale values of the pixel points in each to-be-detected image of the plurality of to-be-detected images;
determine at least one wrinkle line from the plurality of to-be-detected images based on the wrinkle points, wherein each of the at least one wrinkle line indicates one wrinkle in each to-be-detected image of the plurality of to-be-detected images;
perform, for the at least one wrinkle line corresponding to each to-be-detected image, reverse rotation according to a preset angle based on which the to-be-detected image is obtained, to obtain rotated wrinkle lines;
fuse the rotated wrinkle lines into the region in which the wrinkle will be detected, to obtain a wrinkle line corresponding to the region in which the wrinkle will be detected;
display the wrinkle line in the region;
determine a wrinkle score corresponding to the region in which the wrinkle will be detected based on a feature set of the wrinkle line, wherein the feature set comprises the following features: a length of the wrinkle line, a width of the wrinkle line, and a contrast ratio value of a pixel point on the wrinkle line, and an area proportion of the wrinkle line, wherein the contrast ratio value represents a contrast ratio of the pixel point on the wrinkle line, and the area proportion of the wrinkle line represents a proportion of a quantity of pixels on the wrinkle line to a quantity of all pixels in the to-be-detected image; and
output the wrinkle score, wherein the wrinkle score is determined according to the following formula:

$H = A \times \omega1 + B \times \omega2 + C \times \omega3 + D \times \omega4 + \omega5$, wherein H is the wrinkle score, A is the length of the wrinkle line, B is the width of the wrinkle line, C is the contrast ratio value of the pixel point on the wrinkle line, D is the area proportion of the wrinkle line, $\omega1$, $\omega2$, $\omega3$, and $\omega4$ are preset parameters less than o, and $\omega5$ is a preset parameter.

10. The electronic device of claim 9, wherein the instructions further cause the electronic device to:
set a rectangular window;
control, according to a specified sliding step, the rectangular window to traverse each to-be-detected image of the plurality of to-be-detected images;
determine, at each window position in which the rectangular window is located, a central pixel point located at a central position of the rectangular window, and determine a confidence value of the central pixel point based on grayscale values of all pixel points in the rectangular window, to obtain a plurality of confidence values, wherein the confidence value indicates a possibility that the central pixel point is the wrinkle point; and
use a central pixel point corresponding to a confidence value not less than a threshold as the wrinkle point.

11. A computer program product for speckle detecting, the computer program product being embodied in a non-transitory computer readable medium and comprising computer instructions for:
    rotating, according to some or all preset angles in a preset angle set, a region of a face image, in which a wrinkle will be detected, to obtain a plurality of to-be-detected images, wherein the preset angle set comprises a plurality of preset angles, and values of the preset angles are different;
    determining wrinkle points from all pixel points of each to-be-detected image of the plurality of to-be-detected images based on grayscale values of the pixel points in each to-be-detected image of the plurality of to-be-detected images;
    determining at least one wrinkle line from the plurality of to-be-detected images based on the wrinkle points, wherein each of the at least one wrinkle line indicates one wrinkle in each to-be-detected image of the plurality of to-be-detected images;
    performing, for the at least one wrinkle line corresponding to each to-be-detected image, reverse rotation according to a preset angle based on which the to-be-detected image is obtained, to obtain rotated wrinkle lines;
    fusing the rotated wrinkle lines into the region in which the wrinkle will be detected, to obtain a wrinkle line corresponding to the region in which the wrinkle will be detected; and
    displaying the wrinkle line in the region;
    determining a wrinkle score corresponding to the region based on a feature set of the displayed wrinkle line, wherein the feature set comprises the following features: a length of the wrinkle line, a width of the wrinkle line, and a contrast ratio value of a pixel point on the wrinkle line, and an area proportion of the wrinkle line, wherein the contrast ratio value represents a contrast ratio of the pixel point on the wrinkle line, and the area proportion of the wrinkle line represents a proportion of a quantity of pixels on the wrinkle line to a quantity of all pixels in the to-be-detected image; and
    outputting the wrinkle score, wherein the wrinkle score is determined according to the following formula:

$$H = A \times \omega_1 + B \times \omega_2 + C \times \omega_3 + D \times \omega_4 + \omega_5, \text{ wherein}$$

H is the wrinkle score, A is the length of the wrinkle line, B is the width of the wrinkle line, C is the contrast ratio value of the pixel point on the wrinkle line, D is the area proportion of the wrinkle line, $\omega_1$, $\omega_2$, $\omega_3$, and $\omega_4$ are preset parameters less than o, and $\omega_5$ is a preset parameter.

12. The computer program product of claim 11, the computer program product further comprising computer instructions for:
    setting a rectangular window;
    controlling, according to a specified sliding step, the rectangular window to traverse each to-be-detected image of the plurality of to-be-detected images;
    determining, at each window position in which the rectangular window is located, a central pixel point located at a central position of the rectangular window, and determining a confidence value of the central pixel point based on grayscale values of all pixel points in the rectangular window, to obtain a plurality of confidence values, wherein the confidence value indicates a possibility that the central pixel point is the wrinkle point; and
    using a central pixel point corresponding to a confidence value not less than a threshold as the wrinkle point.

\* \* \* \* \*

UNITED STATES PATENT AND TRADEMARK OFFICE
CERTIFICATE OF CORRECTION

PATENT NO. : 11,941,804 B2
APPLICATION NO. : 17/260015
DATED : March 26, 2024
INVENTOR(S) : Hu et al.

Page 1 of 1

It is certified that error appears in the above-identified patent and that said Letters Patent is hereby corrected as shown below:

In the Claims

In Column 32, in Claim 1, Line 2, delete "than o," and insert -- than 0, --.

In Column 34, in Claim 9, Line 50, delete "than o," and insert -- than 0, --.

In Column 36, in Claim 11, Line 16, delete "than o," and insert -- than 0, --.

Signed and Sealed this
Fifteenth Day of October, 2024

Katherine Kelly Vidal
Director of the United States Patent and Trademark Office